US 7,664,831 B2

(12) United States Patent
Cartmell et al.

(10) Patent No.: US 7,664,831 B2
(45) Date of Patent: Feb. 16, 2010

(54) DETERMINING ALTERNATIVE TEXTUAL IDENTIFIERS, SUCH AS FOR REGISTERED DOMAIN NAMES

(75) Inventors: Brian Cartmell, Seattle, WA (US); Jothan Frakes, Normandy Park, WA (US)

(73) Assignee: VeriSign, Inc., Mountain View, CA (US)

(*) Notice: Subject to any disclaimer, the term of this patent is extended or adjusted under 35 U.S.C. 154(b) by 507 days.

(21) Appl. No.: 09/970,096

(22) Filed: Oct. 2, 2001

(65) Prior Publication Data
US 2002/0103820 A1 Aug. 1, 2002

Related U.S. Application Data

(60) Provisional application No. 60/237,253, filed on Oct. 2, 2000.

(51) Int. Cl.
*G06F 15/16* (2006.01)
*G06F 17/30* (2006.01)
*G06F 15/173* (2006.01)

(52) U.S. Cl. .................. 709/219; 709/203; 709/217; 709/223; 707/10

(58) Field of Classification Search ................ 709/203, 709/217, 219, 223, 226, 227, 228, 229, 245; 707/10
See application file for complete search history.

(56) References Cited

U.S. PATENT DOCUMENTS

| 5,805,820 | A |   | 9/1998 | Bellovin et al. |
|---|---|---|---|---|
| 5,884,246 | A |   | 3/1999 | Boucher et al. |
| 6,016,512 | A |   | 1/2000 | Huitema |
| 6,085,242 | A | * | 7/2000 | Chandra ............... 709/223 |
| 6,125,395 | A | * | 9/2000 | Rosenberg et al. ....... 709/228 |
| 6,182,148 | B1 |   | 1/2001 | Tout |
| 6,298,341 | B1 | * | 10/2001 | Mann et al. ............... 707/3 |
| 6,314,469 | B1 |   | 11/2001 | Tan et al. |
| 6,338,082 | B1 |   | 1/2002 | Schneider |
| 6,560,634 | B1 | * | 5/2003 | Broadhurst ............ 709/203 |

(Continued)

OTHER PUBLICATIONS

"Dingo Pioneers New Domain Name Variation Technology", Company Press Release, Oingo, Inc., May 11, 2000, http://web.archive.org/web/20000707005816/www.oingo.com/products/domainsense.html—8 pages.*

(Continued)

*Primary Examiner*—Ario Etienne
*Assistant Examiner*—Gregory G Todd
(74) *Attorney, Agent, or Firm*—Townsend and Townsend and Crew LLP

(57) ABSTRACT

A method, system, and computer-readable medium is described that determines alternatives to a specified textual identifier, such as a domain name, by identifying and using words and phrases that are related to the identifier. A variety of types of related words can be used, such as synonyms and translations, and the related words can be determined in a variety of ways. One situation in which alternatives can be generated is after a user has requested to use or acquire an unavailable textual identifier, such as a request to register an already registered domain name, and the determined alternatives can then be presented to the user as possibilities for use or acquisition. When multiple alternatives are presented to the user, they can also be ranked as to relevance and ordered in a variety of ways.

49 Claims, 26 Drawing Sheets

U.S. PATENT DOCUMENTS

| | | | |
|---|---|---|---|
| 6,687,746 B1 * | 2/2004 | Shuster et al. | 709/223 |
| 6,760,746 B1 * | 7/2004 | Schneider | 709/203 |
| 6,880,007 B1 * | 4/2005 | Gardos et al. | 709/225 |
| 6,901,436 B1 * | 5/2005 | Schneider | 709/219 |
| 6,963,867 B2 * | 11/2005 | Ford et al. | 707/3 |
| 6,980,990 B2 * | 12/2005 | Fellman | 707/10 |
| 7,133,863 B2 * | 11/2006 | Teng et al. | 707/3 |
| 7,162,436 B1 * | 1/2007 | Eckel, Jr. | 705/26 |
| 7,167,904 B1 * | 1/2007 | Devarajan et al. | 709/218 |
| 7,346,605 B1 * | 3/2008 | Hepworth et al. | 707/3 |

OTHER PUBLICATIONS

The American Heritage® Dictionary of the English Language, rank definition, 2000, Houghton Mifflin Company, Fourth Edition, p. 1.*

International Search Report, PCT/US01/30938, Jan. 18, 2002, 4 pages.

"Thesaurus.com", Advertisement, Lexico LLC, 2000, http://www.thesaurus.com/cgi-bin/search?config=roget&words=staircase, 1 page [Accessed Sep. 26, 2000].

"Merriam-Webster's Collegiate Thesaurus" http/:://www.m-w.com/cgi-bin/thesaurus, 1 page [Accessed Sep. 26, 2000].

"Oingo Pioneers New Domain Name Variation Technology", Company Press Release, Oingo, Inc., May 17, 2000, http:/www.oingo.com/pr_051700.html, 2 pages [Accessed Sep. 21, 2000].

"creative naming solutions", Oingo, Inc., 2000, http:/corp.oingo.com/Product_Pages/DomainSense/DomainSense_PRODUCT.html, 2 pages [Accessed Sep. 21, 2000].

"NameFetcher", Network Solutions, Inc., 2000, http:/www.networksolutions.com/purchasing/nameGen.jhtml?_requestid=230755, 3 pages [Accessed Sep. 21, 2000].

"Quick Translations provided by our friends at e-lingo", The Babel Fish Corporation, 1995-2000, http://www.babelfish.com/Languages/English/EnglishMachine.shtml, 3 pages [Accessed Sep. 26, 2000].

Merriam-Webster's College Dictionary, 11th Ed., p. 1382, 2004.

Miller, George A. et al., "Introduction to WordNet: An On-line Lexical Database," revised Aug. 1993, 9 pages.

Miller, George A., "Nouns in WordNet: A Lexical Inheritance System," revised Aug. 1993, 16 pages (pp. 10-25).

* cited by examiner

THE SOURCE FOR .CC DOMAIN NAMES

Translate This Name
THIS DOMAIN IN OTHER LANGUAGES

Join Waiting List
REGISTER WHEN AVAILABLE

Sorry, 'heaven.cc' is already registered.

Here are some other options for 'heaven.cc':

Click on a name to add it to your cart.

abrahams-bosom.cc
abrahamsbosom.cc
bosom-of-abraham.cc
bosomofabraham.cc
celestial-city.cc
celestialcity.cc
city-of-god.cc
cityofgod.cc
heavenly-city.cc
heavenlycity.cc
holy-city.cc
holycity.cc
elysian-fields.cc
elysianfields.cc
promised-land.cc
imaginary-place.cc
heavenlyjewel.cc
mannafromheaven.cc
vaultofheaven.cc

263

 Domain Sense

| Name Variations | Score |
|---|---|
| moving-picture.cc | 23% |
| movingpicture.cc | 23% |
| show-time.cc | 22% |
| black-film.cc | 22% |
| film-festival.cc | 21% |
| filmstudies.cc | 21% |
| filmgenre.cc | 21% |
| film-series.cc | 21% |
| filmography.cc | 21% |

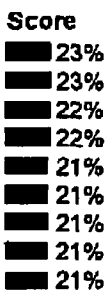

*Fig. 2H*

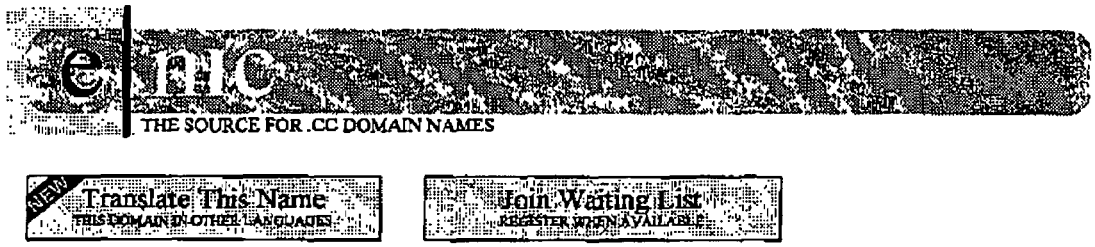

Sorry, 'stairway-heaven.cc' is already registered.

Here are some other options for 'stairway-heaven.cc':

Click on a name to add it to your cart.

267

271
stairway-holycity.cc
stairway-celestial-city.cc
⋮

272
staircase-heaven.cc
stairs-heaven.cc
flight-of-stairs-heaven.cc
⋮

273
stairs-holycity.cc
stairs-celestial-city.cc
flight-of-stairs-holycity.cc
flight-of-stairs-celestial-city.cc
⋮

274
stairway-to-heaven.cc
stairway-for-heaven.cc
my-stairway-heaven.cc
stairway-heaven-yes.cc
⋮

275
heaven-stairway.cc
⋮

*Fig. 2K*

Available translations and related combinations for domain 'stairway-heaven.cc'

276 { Spanish: escalera-cielo.cc [add to cart]
277 { Spanish: stairway-cielo.cc [add to cart]
     { Spanish: escalera-heaven.cc [add to cart]
     { Spanish: escalera-de-cielo.cc [add to cart]
278 { Spanish: mi-escalera-cielo.cc [add to cart]
     { Spanish: escalera-cielo-si.cc [add to cart]
279 { Spanish: cielo-escalera.cc [add to cart]
     French: escalier-ciel.cc [add to cart]
     ⋮

NEW NAME ▪ EDIT DNS ▪ WHO IS?
POLICIES ▪ PAYMENTS ▪ FAQ ▪ HOME

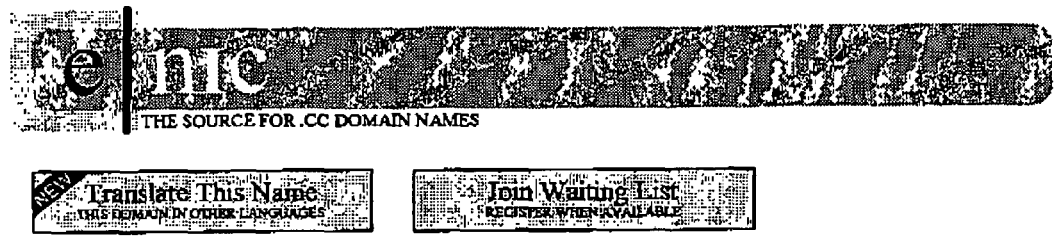

Sorry, 'stairway.heaven.enic.cc' is already registered.

Here are some other options for 'stairway.heaven.enic.cc':

Click on a name to add it to your cart.

291 stairway.holycity.enic.cc
stairway.celestial-city.enic.cc
•
•

292 stairs.heaven.enic.cc
flight-of-stairs.heaven.enic.cc
•
• stairs.holycity.enic.cc
stairs.celestial-city.enic.cc
293 flight-of-stairs.holycity.enic.cc
flight-of-stairs.celestial-city.enic.cc
•
• stairway.to.heaven.enic.cc
stairway.for.heaven.enic.cc
294 my.stairway.heaven.enic.cc
stairway.heaven.yes.enic.cc
•
•

295 heaven.stairway.enic.cc
•
•

Available translations and related combinations for domain 'stairway.heaven.enic.cc'

| | | | |
|---|---|---|---|
| 296 { | Spanish: | escalera.cielo.enic.cc | [add to cart] |
| 297 { | Spanish: | stairway.cielo.enic.cc | [add to cart] |
| | Spanish: | escalera.heaven.enic.cc | [add to cart] |
| | Spanish: | escalera.de.cielo.enic.cc | [add to cart] |
| 298 { | Spanish: | mi.escalera.cielo.enic.cc | [add to cart] |
| | Spanish: | escalera.cielo.si.enic.cc | [add to cart] |
| 299 { | Spanish: | cielo.escalera.enic.cc | [add to cart] |
| | French: | escalier.ciel.enic.cc | [add to cart] |

⋮

NEW NAME ▪ EDIT DNS ▪ WHO IS?
POLICIES ▪ PAYMENTS ▪ FAQ ▪ HOME

Example DNAP-Generated Interactive User-Preference Web Page

You have requested to register the domain name "stairway.cc", but the domain name is not available. Please indicate your preferences related to alternative domain names below and then select the "Submit" button, or instead select the "Cancel Request" button to return to the previously displayed Web page.

| | |
|---|---|
| ☐ Perform default server behavior for unavailable domain names. | ($3US) | or

Generation Alternatives – Present alternative domain names by (select one or more):

☐ Using the following for one or more words in the domain name: ☐ synonyms *and* ☐ antonyms *and* ☐ homophones *and* ... ($1US)
☐ Using other words that are related in meaning but not synonymous (e.g., for "sing": "hum" and "singsong"). (+ $1US)
☐ Using language translations: ☐ Spanish *and* ☐ French *and* ☐ German *and* ☐ Italian *and* ... (+ $2US each)
☐ Using hypernyms and hyponyms (e.g., for "tree": a tree is a "plant", and a "maple" is a tree).
☐ Using meronyms and holonyms (e.g., for "engine": an engine is part of an "automobile" and a "carburetor" is part of an engine).
☐ Using metonyms (e.g., "father" and "child").
☐ Using morphological forms (e.g., for "sing": "sings", "singing", "sang", "singer", "singers").
☐ Using different top-level domains (e.g., for "abc.com": "abc.cc", "abc.org", etc.).
☐ Using more domain levels and less domain levels (e.g., for "abc-def.ghi": "abc.def.ghi" and "abc-def-ghi").
☐ Using domains with additional initial, intermediary, and/or ending words or word fragments (e.g., for "ab-bc": "my-ab-for-bc-biz").
☐ Using idioms (e.g., for "retaliate": "even the score" and "turn the tables on").
...

*and*

Display Alternatives (select at most one of each group):
☐ Maximum of ___ alternatives *or* ☐ Alternatives with minimum relevance ranking of ___ *or* ☐ All alternatives.
☐ Organize alternatives: ☐ alphabetically *or* ☐ by types *or* ☐ by relevance ranking *or* ☐ by price *or* ...

*and*

Selection Alternatives (optionally select one or more):
☐ Temporarily reserve top ___ ranked alternatives *or* ☐ Register top ___ ranked alternatives *or* ...     *($5US per reserve and $20US per register)*

*and*

Future Behavior Determination (optionally select):
☐ Store these preferences, and do not present this Preference Web Page again for future requests.

I agree to pay indicated costs for each use of this service.

| Submit (I agree to pay indicated costs for each use of this service) | | Cancel Request (No alternatives) |
|---|---|---|

*Fig. 2P*

Example DNAP Synonym Related Word Database

| Word | Related Words (word, relevance rating, diminisher;) |
|---|---|
| 302 backstairs | companionway, 0.9, 0.9; fire escape, 0.8, 0.7; emergency exit, 0.75, 0.7; , 0.6, 0.7; ... |
| 304 staircase | stairs, 1, 0.9; stairway, 0.9, 1; backstairs, 0.9, 0.9; moving staircase, 0.8, 0.8; flight of stairs, 0.65, 0.6; flight of steps, 0.6, 0.5; ... |
| 306 stairway | stairs, 1, 1; staircase, 1, 0.9; moving stairway, 0.65, 0.8; ghat, 0.5, 0.5; riser, 0.4, 0.3; ... |
| 308 stairway heaven | psychedelic drugs, 0.8, 0.5; |

*Fig. 3A*

DETERMINING ALTERNATIVE TEXTUAL IDENTIFIERS, SUCH AS FOR REGISTERED DOMAIN NAMES

CROSS REFERENCE TO RELATED APPLICATION

This application claims the benefit of U.S. Provisional Application No. 60/237,253, filed Oct. 2, 2000, incorporated herein by reference.

TECHNICAL FIELD

The following disclosure relates generally to determining alternatives that are related to specified text, and more particularly to determining alternatives to a specified textual identifier by identifying words and phrases that are related to the identifier, such as for a registered domain name.

BACKGROUND

The Internet enables a user of a client computer system to identify and communicate with millions of other computer systems located around the world. A client computer system can identify each of these other computer systems using a unique numeric identifier for that computer called an "IP address." When a communication is sent from a client computer system to a destination computer system, the client computer system typically specifies the IP address of the destination computer system in order to facilitate the routing of the communication to the destination computer system. For example, when a request for a World Wide Web page ("Web page") is sent from a client computer system to a Web server computer system ("Web server") from which that Web page can be obtained, the client computer system typically includes the IP address of the Web server.

In order to make the identification of destination computer systems more mnemonic, a Domain Name System (DNS) has been developed that translates a unique alphanumeric name for a destination computer system into the IP address for that computer. The alphanumeric name is called a "domain name." For example, the domain name for a hypothetical computer system operated by IBM Corporation may be "comp23.IBM.com". Using domain names, a user attempting to communicate with this computer system could specify a destination of "comp23.IBM.com" rather than the particular IP address of the computer system (e.g., 198.81.209.25).

A user can also request a particular resource (e.g., a Web page or a file) that is available from a server computer by specifying a unique Universal Resource Indicator ("URI"), such as a Uniform Resource Locator ("URL"), for that resource. A URL includes a protocol to be used in accessing the resource (e.g., "http:" for the HyperText Transfer Protocol ("HTTP")), the domain name or IP address of the server that provides the resource (e.g., "comp23.IBM.com"), and optionally a path to the resource (e.g., "/help/HelpPage-.html")-thus "http://comp23.IBM.com/help/HelpPage.html" is one example of a URL. In response to a user specifying such a URL, the comp23.IBM.com server would typically return a copy of the "HelpPage.html" file to the user.

In addition to making the identification of destination computer systems more mnemonic, domain names introduce a useful layer of indirection between the name used to identify a destination computer system and the IP address of that computer system. Using this layer of indirection, the operator of a particular computer system can initially associate a particular domain name with a first computer system by specifying that the domain name corresponds to the IP address of the first computer system. At a later time (e.g., if the first computer system breaks or must be replaced), its operator can "transfer" the domain name to a second computer system by then specifying that the domain name corresponds to the IP address of the second computer system.

The domain names in DNS are structured in a hierarchical, distributed database that facilitates grouping related domain names and computers and ensuring the uniqueness of different domain names. In particular, as mentioned above, a particular domain name such as "IBM.com" may identify a specific host computer. However, the hierarchical nature of DNS also allows a domain name such as "IBM.com" to represent a domain including multiple other domain names each identifying computers (also referred to as "hosts"), either in addition to or instead of identifying a specific computer. FIG. 1 illustrates a hypothetical portion of the DNS database 100 in which the node representing the IBM.com domain name 110 is the root node in an IBM.com domain 150 that includes 7 other nodes each representing other domain names. Each of these domain names in the IBM.com domain can be, but do not have to be, under the control of a single entity (e.g., IBM Corporation). FIG. 1 also includes a WebHostingCompany.com domain 155 that includes a single domain name.

As is illustrated, the DNS database can be represented with a hierarchical tree structure, and the full domain name for a given node in the tree can be determined by concatenating the name of each node along the path from the given node to the root node 101, with the names separated by periods. Thus, the 8 nodes in the IBM.com domain represent the domain names IBM.com 110, foo.IBM.com 112, foo.foo.IBM.com 118, bar.foo.IBM.com 120, bar.IBM.com 114, comp23.IBM.com 116, abc.comp23.IBM.com 122, and cde.comp23.IBM.com 124. Other ".com" domain names outside the IBM.com domain are also illustrated in FIG. 1, including the second-level domain names BCD-Corp.com 132, WebHostingCompany.com 134, 1-800-555-1212.com 142 and 123456.com 144, and the lower-level domain names 123.123456.com 146 and 456.123456.com 148. In addition to the ".com" top-level domain ("TLD"), other TLDs are also illustrated including the ".cc" geographical TLD and the ".gov", ".edu" and ".mil" organizational TLDs. Illustrated domain names under these other TLDs include Stanford.edu 136, Berkeley.edu 138, and RegistrarCompany.cc 140.

New domain names can be defined (or "registered") by various domain name registrars. In particular, a company that serves as a registrar for a TLD can assist customers in registering new domain names for that TLD and can perform the necessary actions so that the technical DNS information for those domain names is stored in a manner accessible to name servers for that TLD. Registrars often maintain a second-level domain name within the TLD (e.g., a hypothetical Registrar Company that acts as a registrar for the ".cc" TLD could maintain the RegistrarCompany.cc domain name 140), and provide an interactive Website at their domain name from which customers can register new domain names. A registrar will typically charge a customer a fee for registering a new domain name.

For the ".com", ".net" and ".org" TLDs, a large number of registrars currently exist, and a single shared registry ("the Registry") under the control of a third-party administrator stores information identifying the authoritative name servers for the second-level domain names in those TLDs. Other TLDs may have only a single registrar, and if so that registrar could maintain a registry for all the second-level domains in that TLD by merely storing the appropriate DNS information for each domain name that the registrar registers. In other situations, multiple registrars may exist for a TLD, but one of the registrars may serve as a primary registrar that maintains a registry for each of the second-level domains in that TLD—if so, the secondary or affiliate registrars for that TLD supplies the appropriate DNS information for the domain names that they register to the primary registrar. Thus, the manner in which the DNS information for a TLD is obtained and stored is affected by the registrars for that TLD.

While the DNS system provides many benefits, various problems exist. For example, there are currently are a limited number of TLDs, and many available domain names in the most popular TLDs (e.g., ".com") have already been taken. Thus, users will often attempt to register domain names that are already registered. In such a situation, the user will be prevented from registering the domain name, but may receive little or no assistance in determining other domain names that are available. For example, the user will typically have to identify other domain names to consider without assistance. If the user is able to identify any other domain names, it is then difficult for the user to determine whether those other domain names are available. Typically, the user will need to attempt to register each of those other domain names one-at-a-time to determine if they are available. This is a time-consuming and inefficient process.

BRIEF DESCRIPTION OF THE DRAWINGS

FIG. 3A illustrates an example of a portion of a database of related words used to generate alternative domain names.

DETAILED DESCRIPTION

Figure 1:
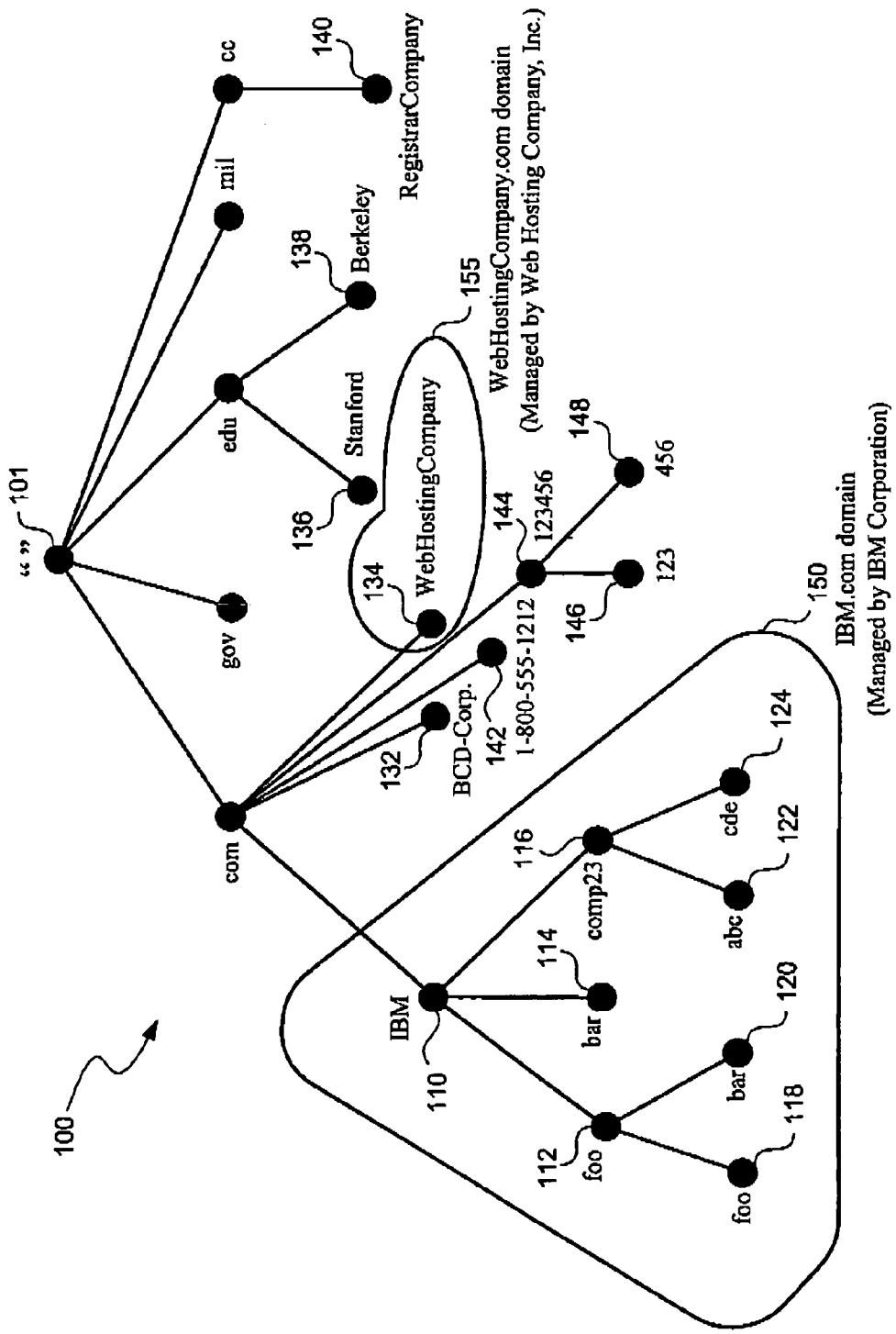
FIG. 1 is a network diagram illustrating interconnected network devices and Domain Name System (DNS) information.

A software facility is described below that determines alternatives to a specified textual identifier, such as a domain name, by identifying and using words and phrases that are related to the identifier. As discussed in greater detail below, a variety of types of related words can be used, and the related words can be determined in a variety of ways. In some embodiments, alternatives are determined after a user has requested to use or acquire an unavailable textual identifier, such as a request to register an already registered domain name, and the determined alternatives are then presented to the user as possibilities for use or acquisition. When multiple alternatives are presented to the user, they can also be ranked as to relevance and ordered in a variety of ways.

For illustrative purposes, some embodiments of the software facility are described below in which alternative related DNS domain names are determined for a specified domain name, such as one that is already registered. However, those skilled in the art will appreciate that the techniques of the invention can be used in a wide variety of other situations, some of which are discussed below, including any situation in which alternatives to textual identifiers can be used.

In particular, the Domain Name Alternative Provider (DNAP) system is an example embodiment of the software facility in which alternatives to a specified domain name are determined and presented to a user, such as after the user has attempted to register an already registered domain name. Those skilled in the art will appreciate that this example system could also be used for purposes other than providing alternatives to registered domain names, such as for presenting alternatives to a user who desires to register multiple or all domain names that are sufficiently related to a specified domain name.

To provide alternative domain names, the DNAP system generates alternatives for one or more lower-level domain name portions (i.e., domain name portions other than the TLD portion) of a specified domain name. If there are multiple lower-level domain name portions, then alternatives for each such domain name portion can be determined and then joined in various combinations.

Each alternative lower-level domain name portion or combination of portions can then be added to the TLD of the specified domain name to generate alternative domain names within the same TLD. In some embodiments, the DNAP system also determines alternate TLDs that can be used for domain name alternatives, and if so can add some or all of the various alternatives for the lower-level domain name portions to the alternate TLDs. Before providing domain name alternatives, the system can also determine if those alternatives are available to be registered, and if not can remove or otherwise identify the non-available domain name alternatives.

To generate alternatives for a particular lower-level domain name portion, the DNAP system attempts to identify one or more words, phrases, or partial words (also referred to as "target words") that are included in that domain name portion. For each such target word, the system then attempts to determine a variety of alternative words, phrases, or partial words (also referred to as "option words") that are related to the target word. Partial words can include not only abbreviations or shortened versions of words (e.g., "zine" for "magazine", "biz" for "business", and "mr." or "mr" for "mister"), but also slang or other alternatives to actual words (e.g., "yez" for "yes", "2" for "to", and "411" for "information"). In some embodiments, the system also attempts to associate a relevance rating with each option word that identifies how closely related the option word is to its corresponding target word. As discussed in greater detail below, option words can be determined in a variety of ways, including by identifying synonyms of the target word (e.g., from a thesaurus) and by translating the target word into other languages.

After the option words are identified, alternatives for the domain name portion can be generated by replacing one or more target words in that domain name portion with one of the option words for that target word. In some embodiments, additional alternatives are generated by optionally including additional option words at the beginning, end, and in the middle of other alternative domain name portions, and optionally including connectors (e.g., "-") between the various option words. If relevance ratings are being used and a domain name portion has a single target word, then the relevance rating of an alternative for that domain name portion can be based on the relevance rating of the option word used in the alternative. If multiple target words are included in the domain name portion, then a relevance for an alternative to the domain name portion can be determined by combining the relevance ratings of each of the option words in that alternative. In a similar manner, if multiple lower-level portions are present and alternatives for each portion are combined, a relevance rating for the combination can be determined by combining the relevance ratings of each of the constituent domain name portion alternatives.

After one or more domain name alternatives have been generated, the alternatives can be provided or presented to a user. In some embodiments, the alternatives are included as part of an interactive Web page provided to the user from which the user can select one or more of the alternatives for registration. In embodiments in which relevance ratings are determined, the ratings associated with each alternative can also be presented to the user. The various alternatives can be presented in a variety of ways, such as in order of relevance, in alphabetical order, or grouped into categories based on how the alternative was generated.

Figure 2A:
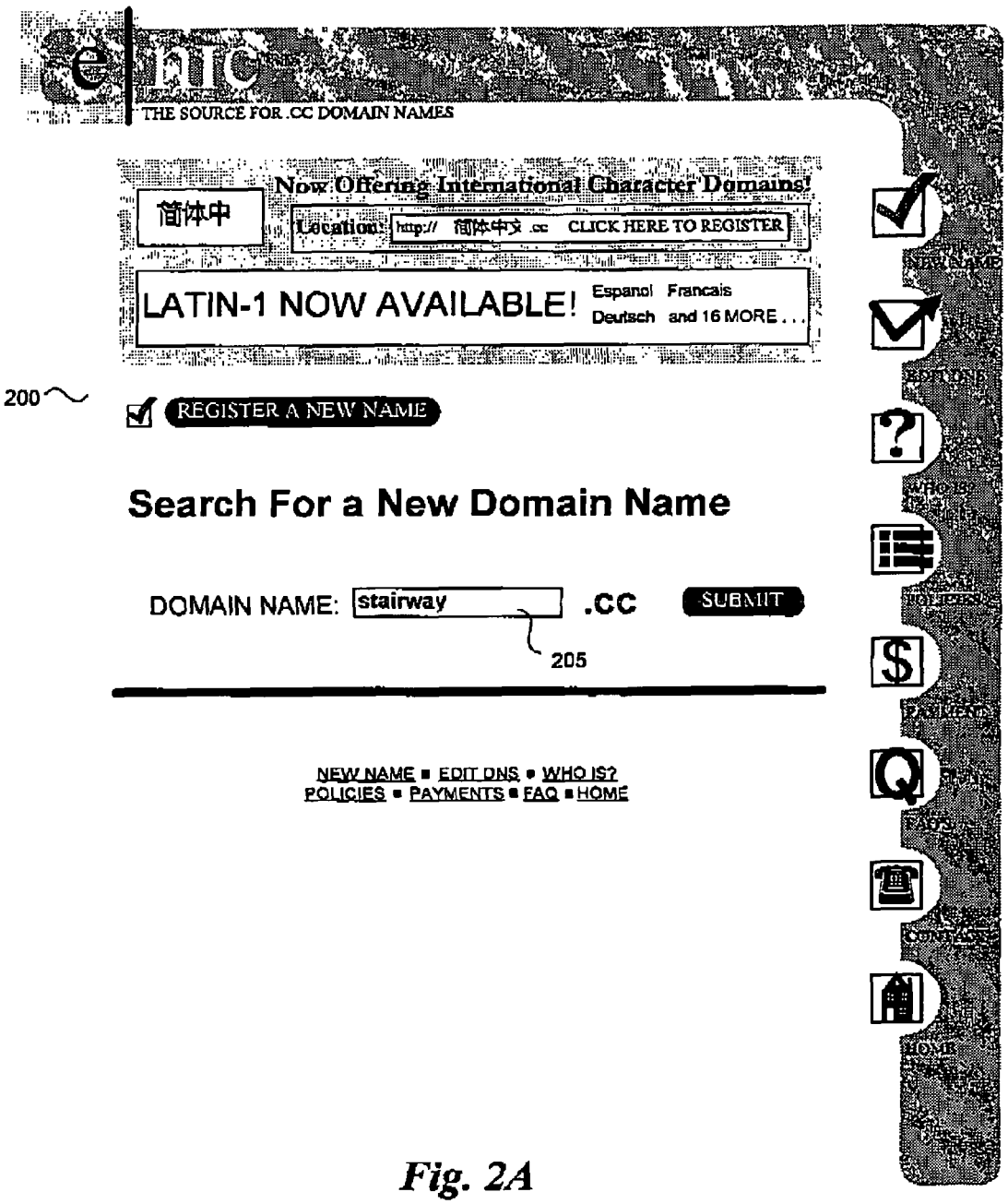
FIGS. 2A-2P illustrate using an example Domain Name Alternative Provider (DNAP) system to obtain alternative domain names that are related to a domain name of interest that is already registered.

As an illustrative example of the use of the DNAP system, consider the domain name registration request illustrated in FIG. 2A, in which the user has requested to register the domain name "stairway.cc" 205. In this example, a user is interacting with a Web browser program on a client computer that has a Web page 200 displayed. Web page 200 is an interactive domain name registration page provided by a registrar for a TLD, such as the registrar eNIC Corporation for the ".cc" TLD (at the time of this writing, such a page is available at URL "http://www.enic.cc/new.html").

Figure 2B:
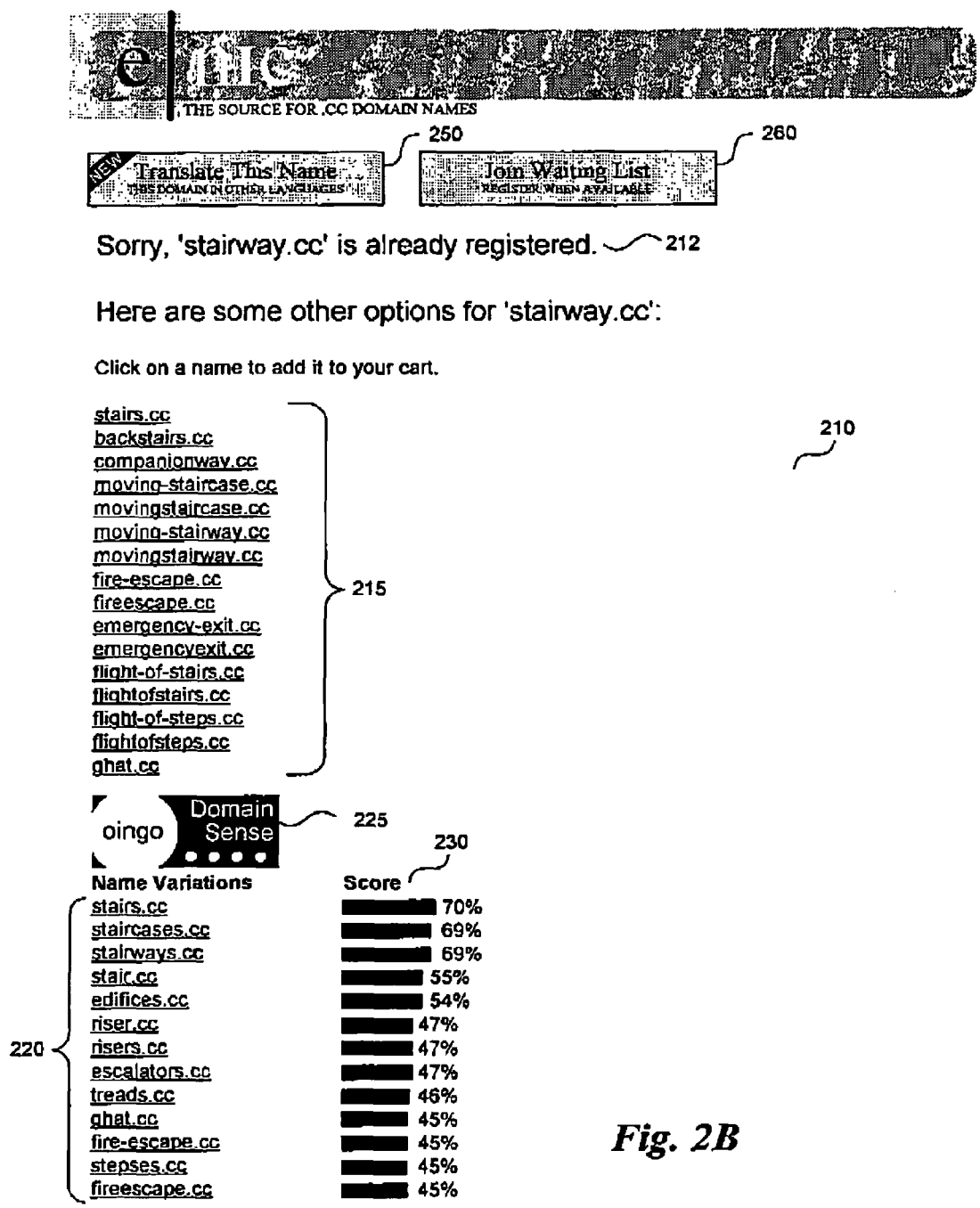
Figure 2C:
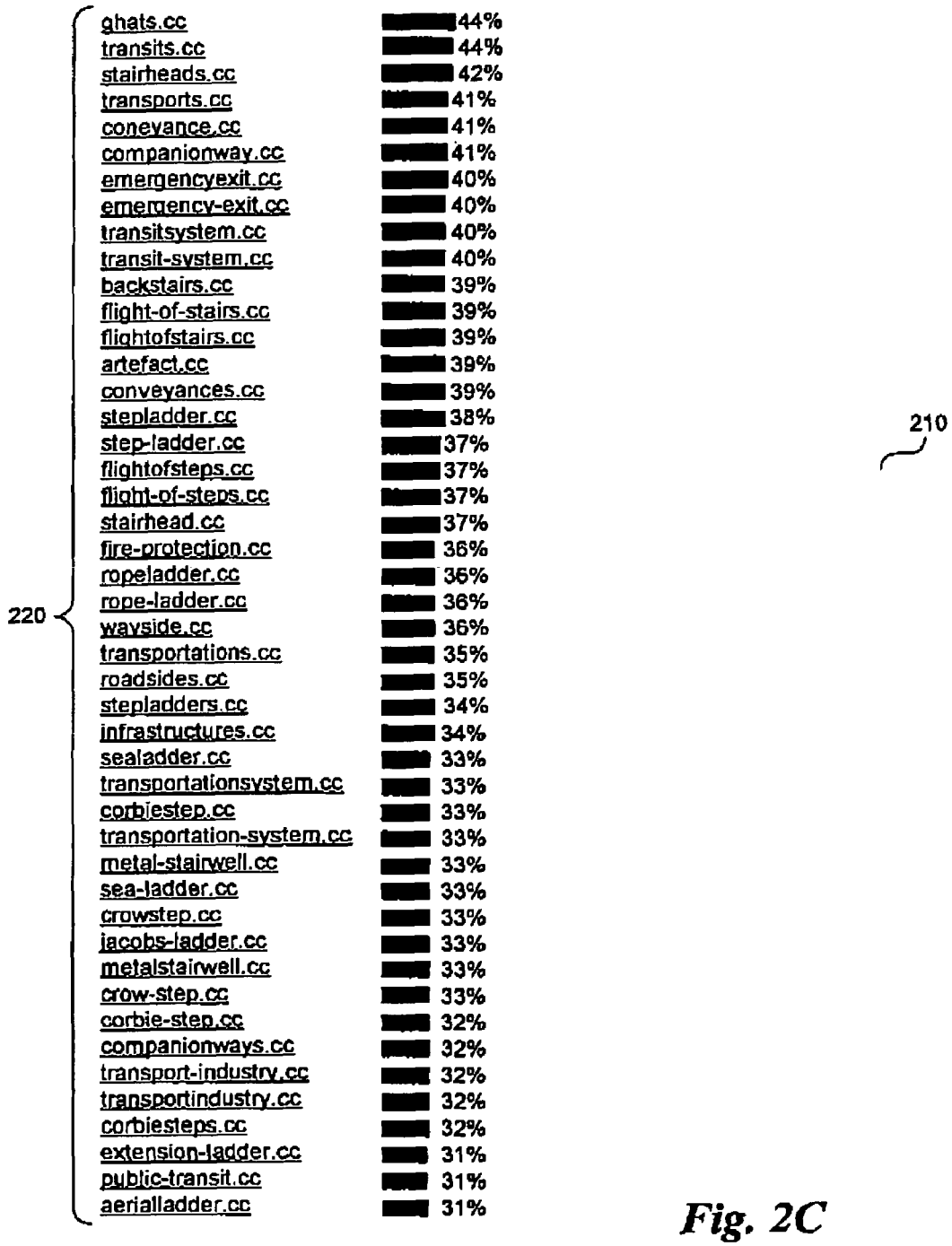
Figure 2D:
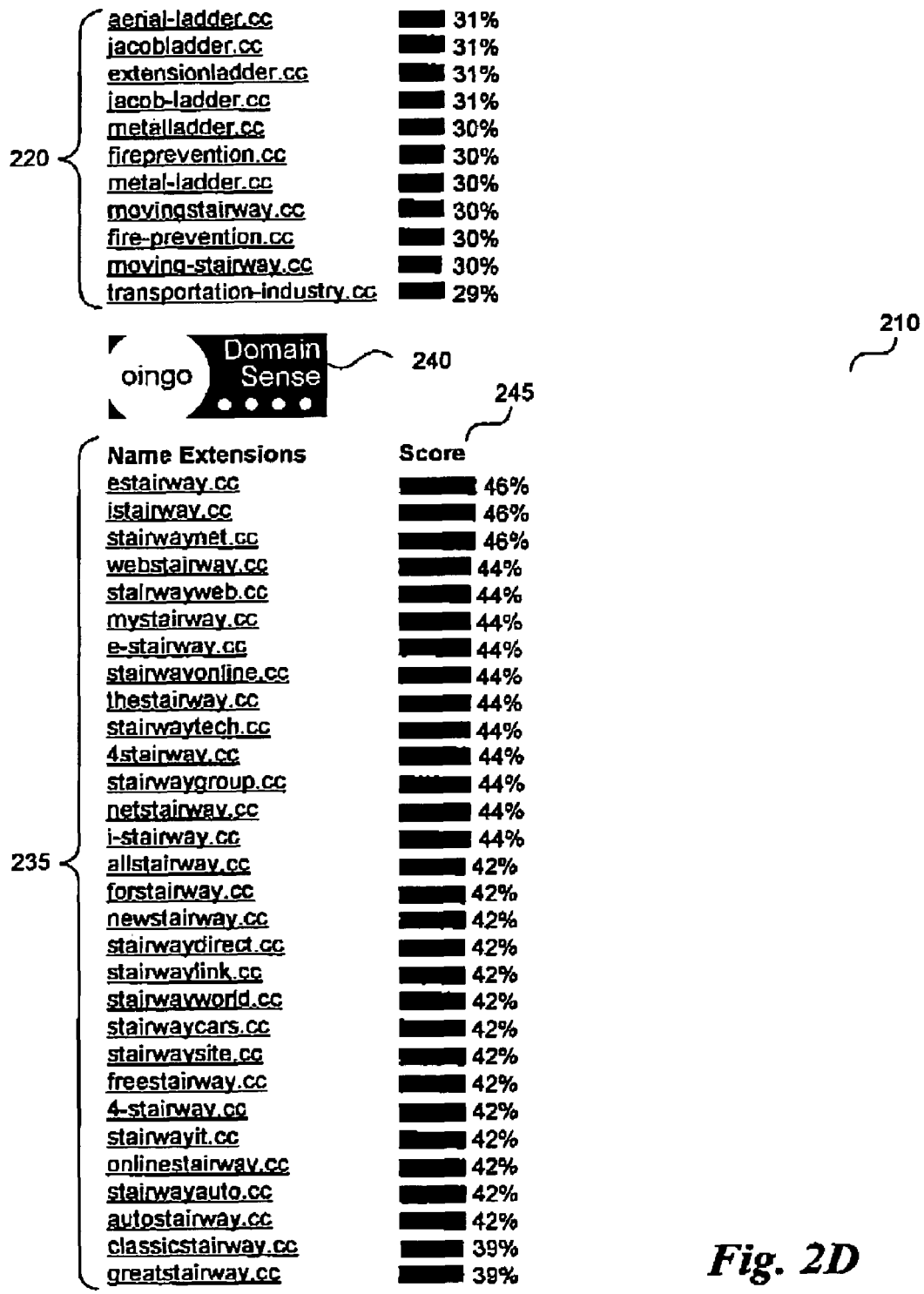
Figure 2E:
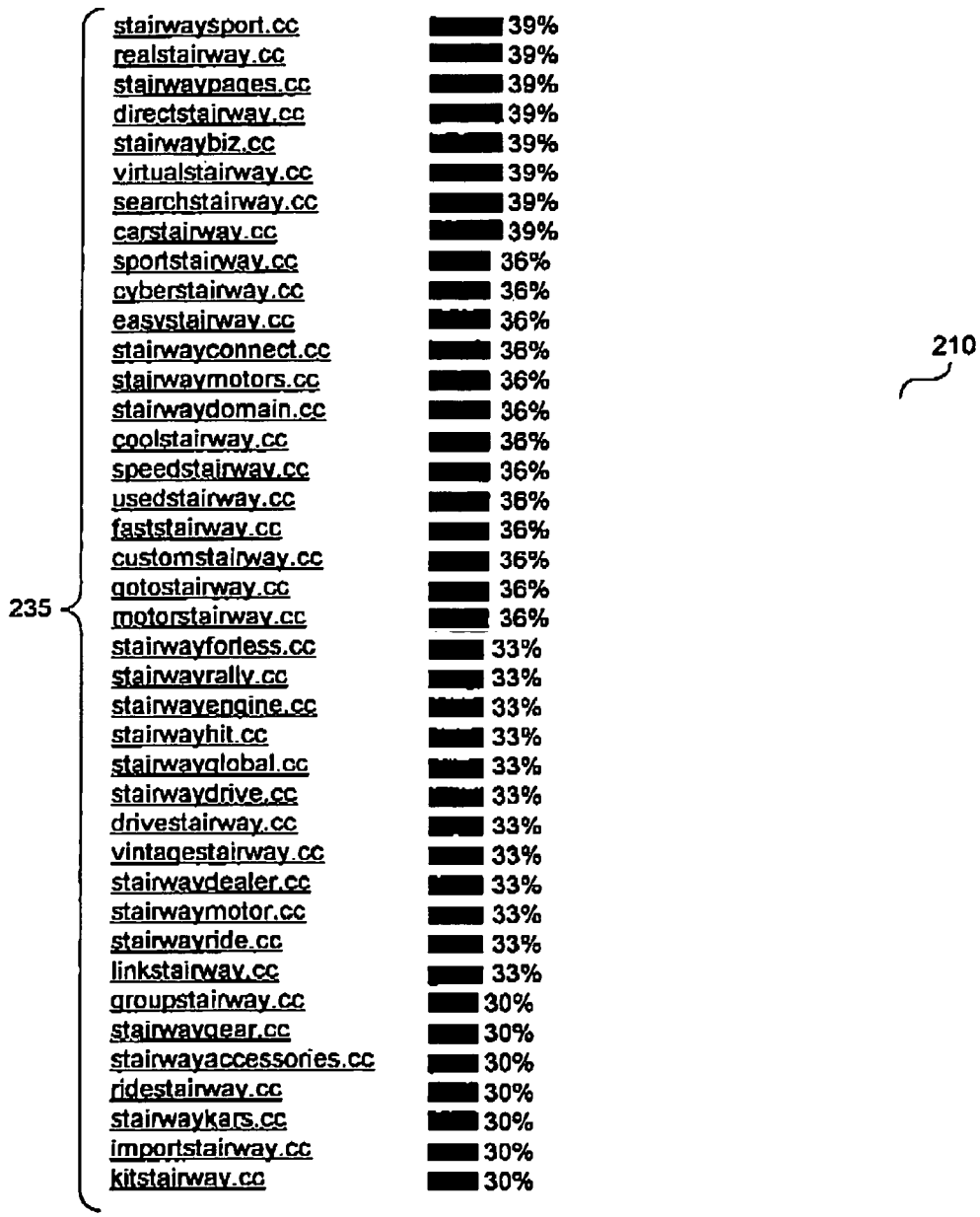

In response to the registration request, the user receives a response Web page 210 that is illustrated in FIGS. 2B-2E. In particular, as is illustrated in FIG. 2B, the Web page provides an indication 212 to the user that the specified domain name "stairway.cc" is already registered. The Web page also provides a variety of alternative domain names that are available to be registered. For example, the Web page includes a group of alternative domain names 215 in which the lower-level domain name portion "stairway" has been replaced with option words that are synonyms for or closely related to "stairway". Such synonyms can be generated by the DNAP system in a variety of ways, such as by requesting a third-party thesaurus service to provide the option words (e.g., the WordNet service, available at the time of this writing at "http://www.cogsci. princeton.edu/cgi-bin/webwn") or by consulting a database of synonyms (e.g., the WordNet database at "http://www.cogsci.princeton.edu/~wn/"). In addition, as is indicated, the user can begin the registration process for any of these alternative domain names by clicking on that domain name. Note that a domain name that includes the common synonym "staircase" is not illustrated, because in this illustrated embodiment the domain name "staircase.cc" is already registered. In addition, when an option word is a phrase such as "moving stairway", alternate domain names can include the words in the phrase separated by different possible connectors, such as "-" (e.g., "moving-stairway.cc") or the null connector " " (e.g., "movingstairway.cc").

In this illustrated embodiment, the Web page also includes two other groups of alternative domain names 220 and 235. Each of these other groups are provided through interactions with a third-party service (e.g., from Oingo Inc., whose Website is available at the time of this writing at "www.oingo.com"), and the Web page includes indications 225 and 240 of those services. In some embodiments, such a third-party service may directly provide the alternative domain names and the DNAP system may provide additional processing such as to remove alternatives that are already registered, while in other embodiments the third-party service may provide option words related to a specified word (e.g., "stairway") and the DNAP system may generate alternative domain names based on those option words. Groups 220 and 235 also have associated displayed relevance ratings 230 and 245 for the alternative domain names, and the DNAP system has ranked the domain names within the groups based on the ratings. The DNAP system could either have received such ratings from the third-party service, or could instead have generated the ratings itself.

The alternative domain names in group 220 include domain names in which, similarly to group 215, the lower-level portion of the specified domain name has been replaced with option words that are synonyms or related words for "stairway". Some of the domain names in group 220 are also members of group 215 (e.g., "stairs.cc"), while other members include option words that are less related to "stairway", such as "rope ladder", "transportation system", and "great stairway". The alternative domain names in group 235 are of a different type then those in group 215, instead modifying the lower-level portion "stairway" of the specified domain name to include additional initial word options (e.g., "web", "4", and "e") or additional ending word options (e.g., "web", "biz" and "for less"), with the additional words separated from "stairway" by one or more possible connectors (e.g., "estairway.cc" and "e-stairway.cc").

Figure 2F:
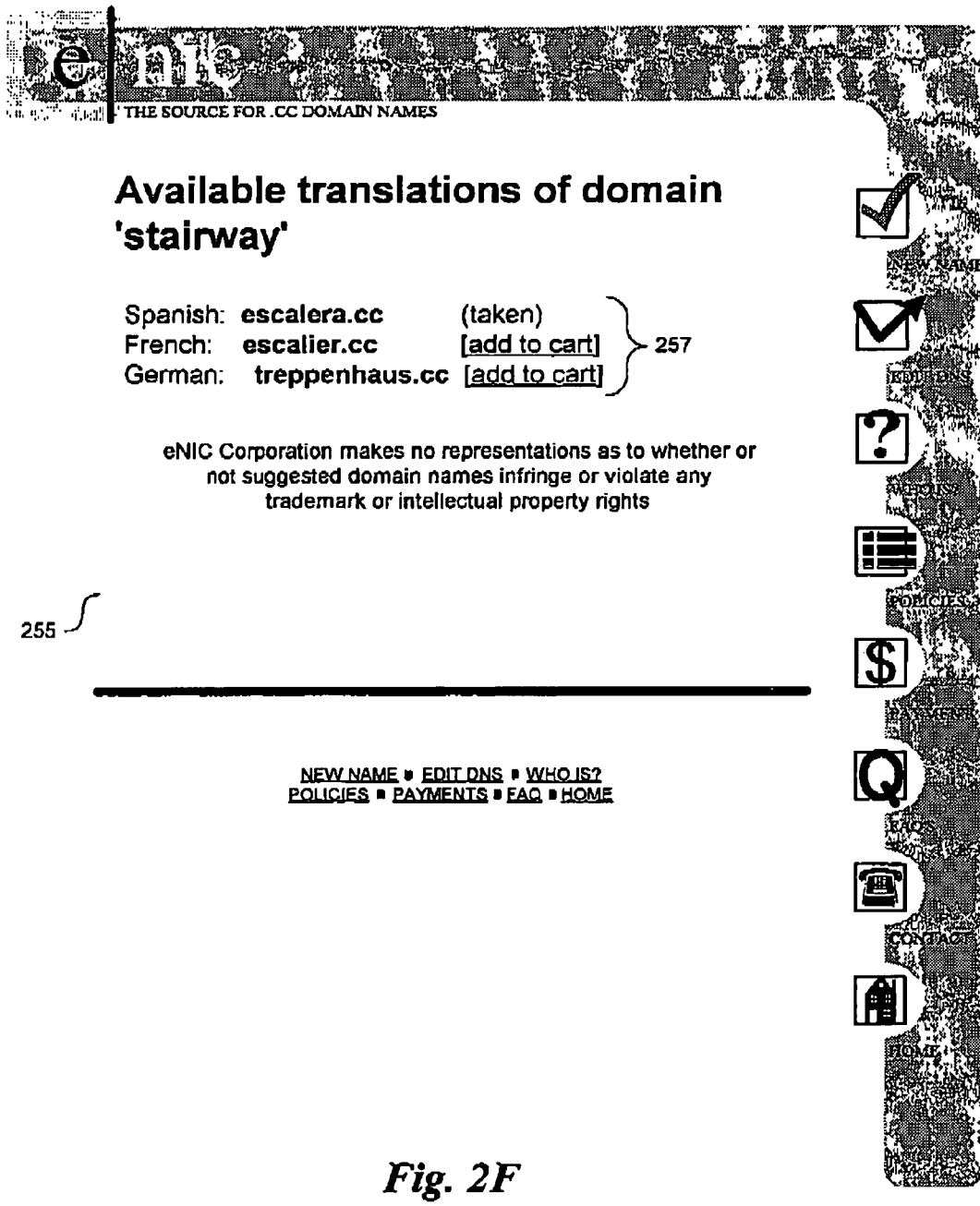

The Web page also includes a user-selectable indication 250 which can be used to determine alternative domain names based on translations of lower-level portions of the specified domain name, and FIG. 2F illustrates a Web page 255 that is provided by the DNAP system after the user selects the indication. In particular, multiple domain names 257 based on translations of "stairway" into various foreign languages can be provided, and can be selected by the user for registration if those domain names are available. Those skilled in the art will appreciate that a variety of foreign languages could be provided, and that in other embodiments such domain names could instead be provided as part of Web page 210. As with synonyms, the DNAP system could maintain one or more databases with appropriate translations, or could instead use a third-party service to assist with such translations (e.g., from one of the translation services listed at the "www.babelfish.org" Website).

In addition to indication 250, the Web page 210 includes a user-selectable indication 260 which can be used to place the user on a waiting list for the specified domain name. Domain names that are currently unavailable may become available for a variety of reasons. For example, in the illustrated embodiment domain names may be temporarily reserved for a user in various situations, such as for a short time while they are presented as alternative domain names to the user. In addition, a registered domain name may become available if the owner does not renew its registration. Those skilled in the art will appreciate that other services related to currently unavailable domain names could also be provided. For example, if an owner of the specified domain name had indicated an interest in selling the domain name, the DNAP system could connect the user to an auction for the specified domain name. Alternately, the system could relay a bid for the domain name from the user to the owner.

Figure 2G:
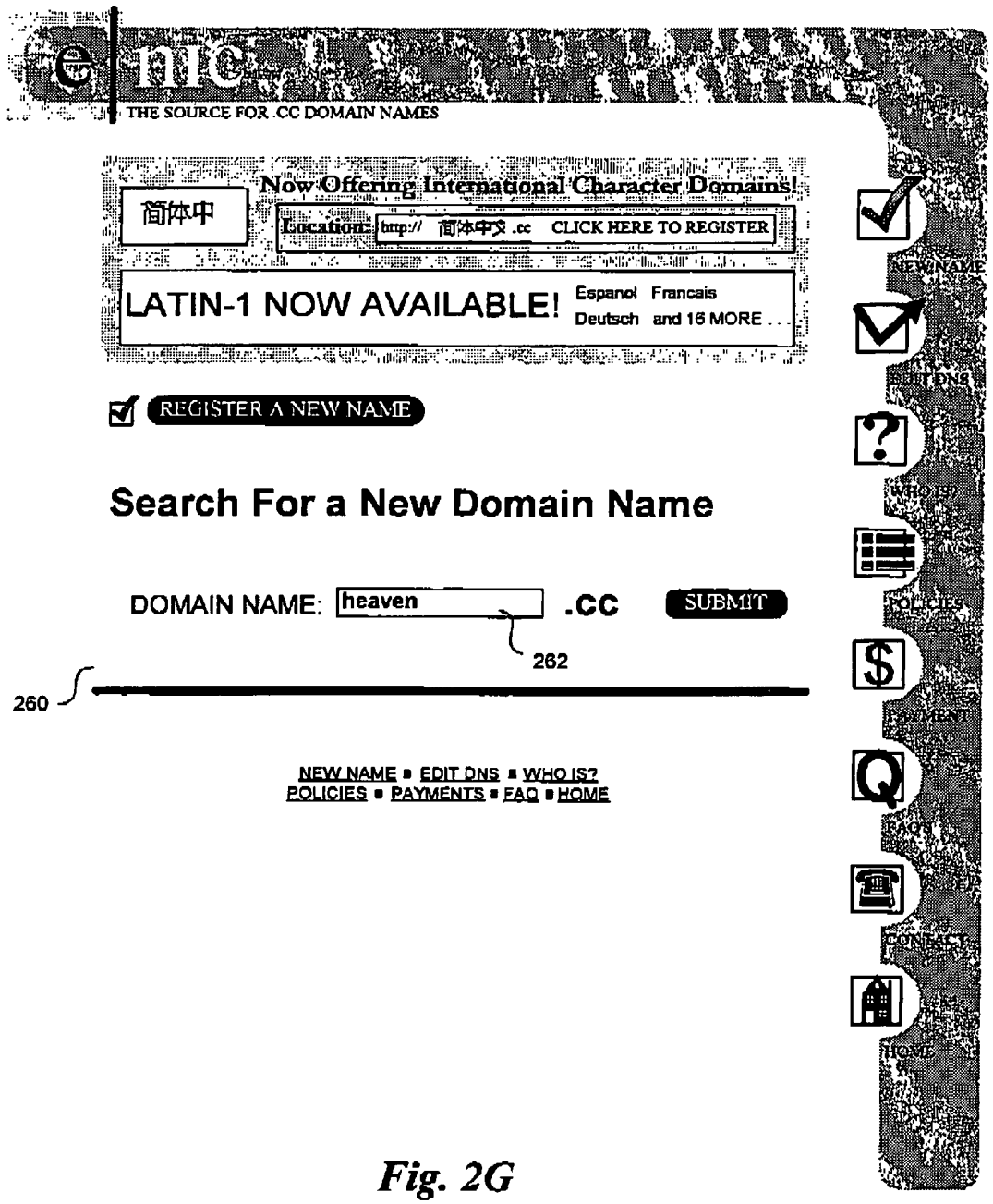
Figure 21:
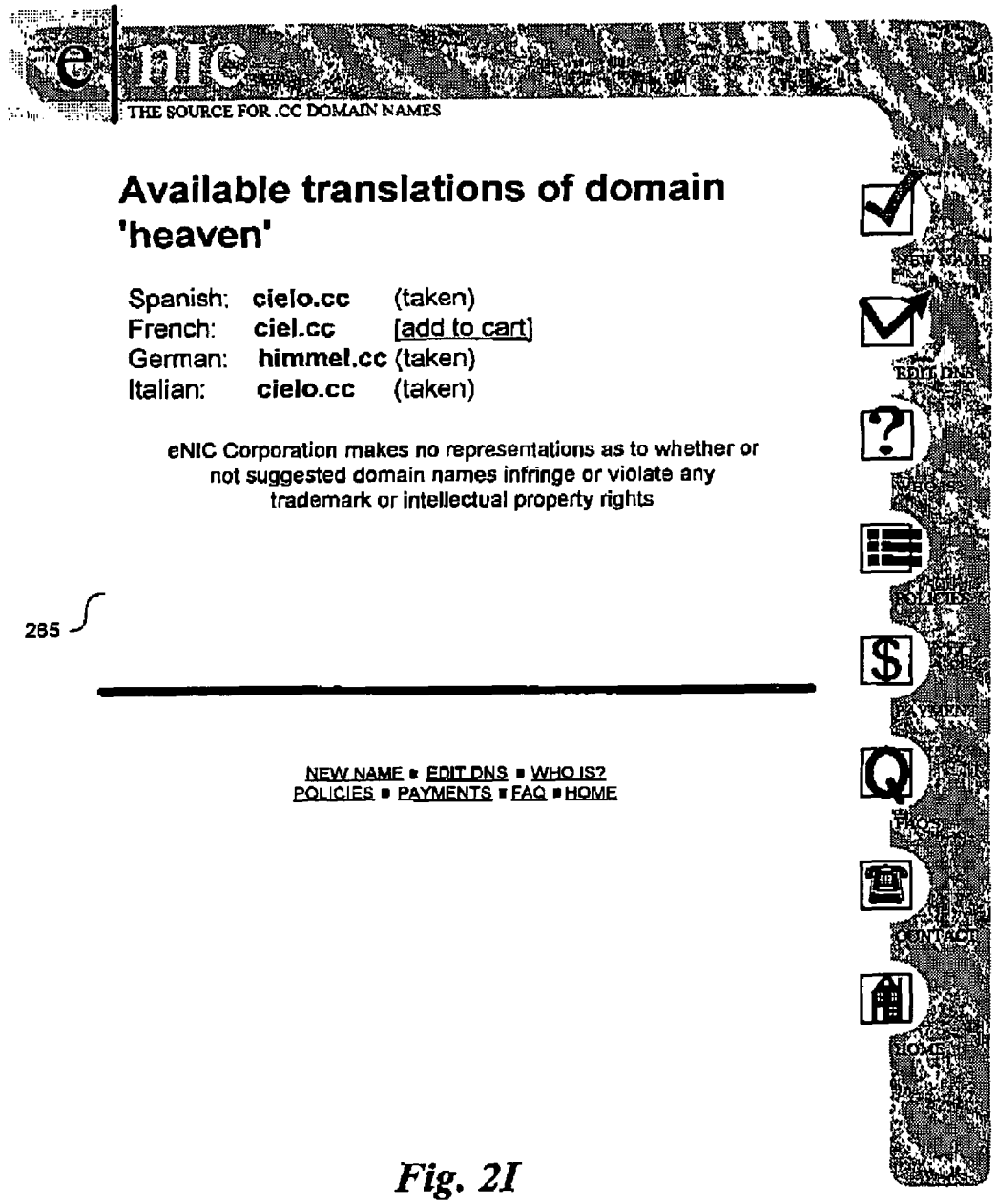

In a similar manner to that of FIG. 2A, FIG. 2G illustrates a Web page 260 in which the user is requesting to register the domain name "heaven.cc" 262. FIGS. 2H and 2I illustrate possible Web pages 263 and 265 with alternative domain names that may be provided to the user if the domain name is already registered.

Figure 2J:
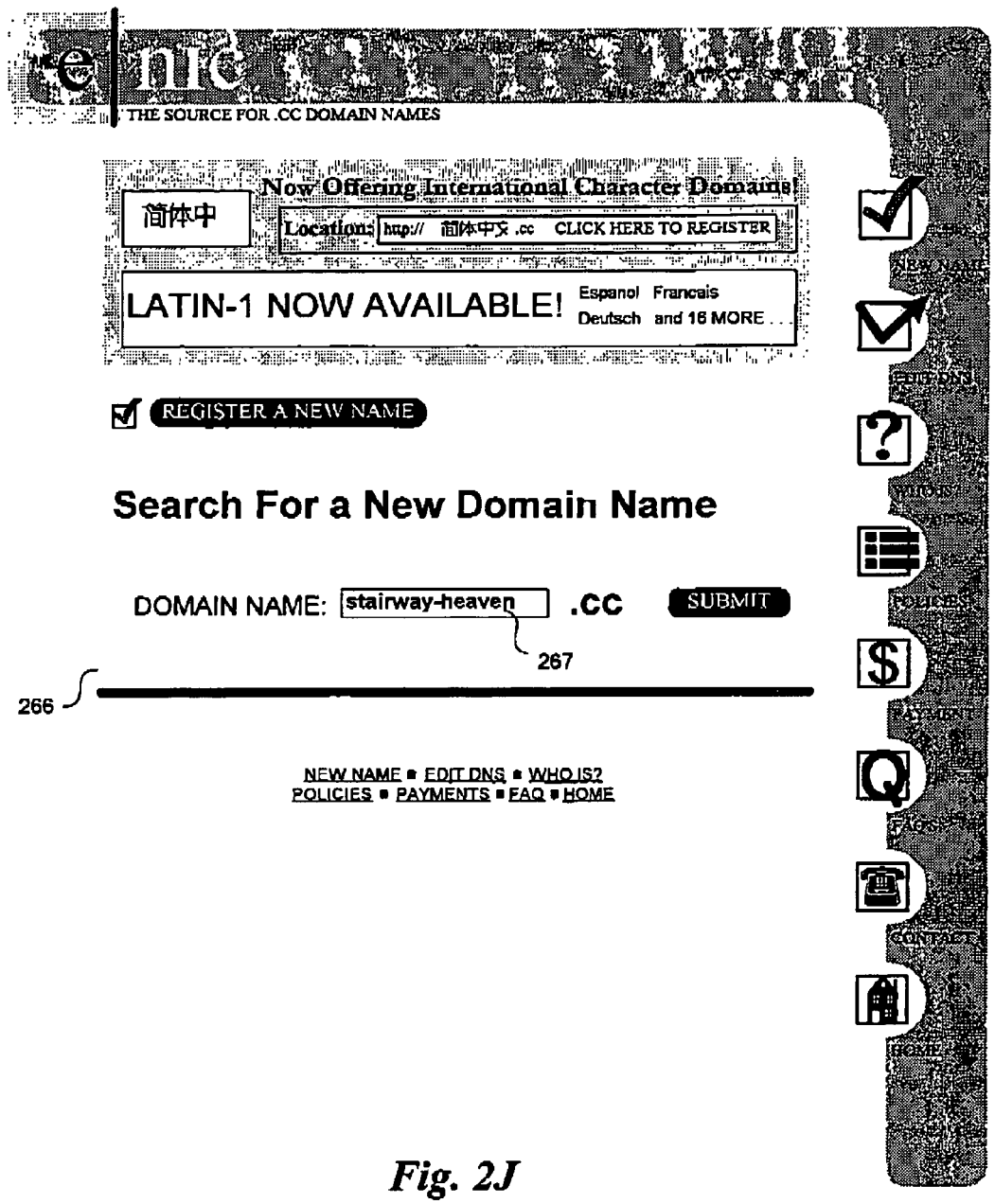

FIG. 2J next illustrates a Web page 266 in which the user is attempting to register a second-level domain name "stairway-heaven.cc" 267 in which the second-level domain name portion includes multiple target words (i.e., "stairway" and "heaven"). FIGS. 2K and 2L illustrate possible Web pages 267 and 269 with alternative domain names that may be provided to the user if the domain name is already registered. In particular, as is illustrated in FIG. 2K, alternative domain names include domain names 272 in which the first target word "stairway" is replaced with various options words (e.g., "staircase" and "flight of stairs"), domain names 271 in which the second target word "heaven" is replaced with various option words (e.g., "holy city" and "celestial city"), domain names 273 in which both target words are replaced with option words, domain names 274 in which additional initial, intermediate, and ending option words (e.g., "my", "to", and "yes" respectively) and word connectors are added to the second-level domain name portion, and a domain name 275 in which the order of the target words is modified. Note that while the synonym "staircase" for "stairway" was not used in FIG. 2B because the domain name "staircase.cc" was not available, this synonym may still be used here as an option word for "stairway". In addition, if the phrase "stairway heaven" had synonyms (e.g., if it was a slang expression for psychedelic drugs such as LSD), such synonyms could also be used as related words for the phrase "stairway heaven" when generating alternative domain names (e.g., "LSD.cc").

FIG. 2L similarly illustrates various alternative domain names for "stairway-heaven.cc" in which one or more of the target words is translated into another language, such as alternative 276 in which both target words are translated into Spanish, alternatives 277 in which only one of the target words is translated, alternatives 278 in which both target words and an additional initial, intermediate, or ending option word are all translated, and alternative 279 in which the target words are translated and listed in reverse order. Those skilled in the art will appreciate that a variety of other types of alternative domain names could similarly be displayed.

Figure 2M:
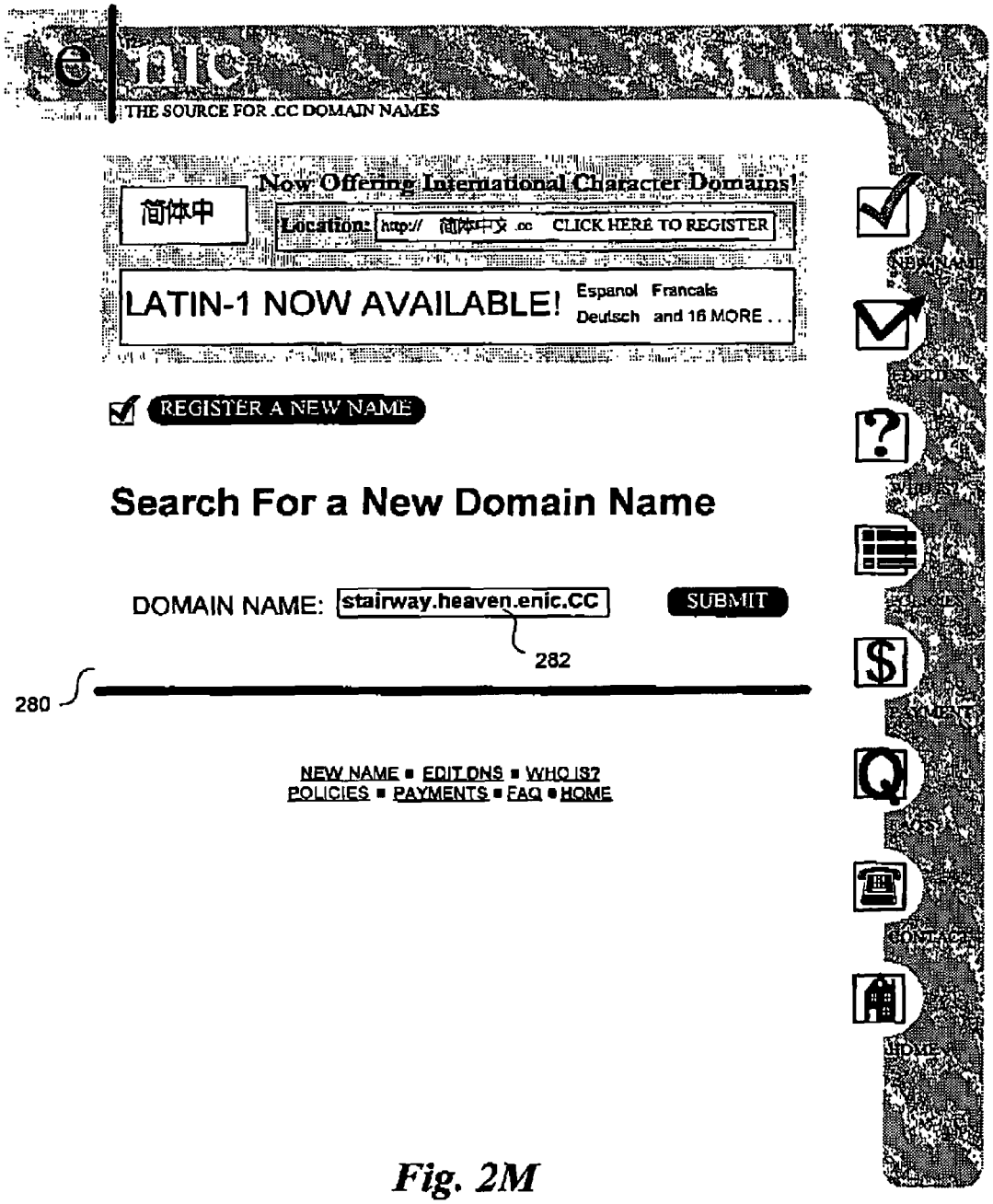

FIGS. 2M, 2N and 2O similarly illustrate Web pages for a specified domain name with multiple lower-level domain name portions. In particular, FIG. 2M illustrates a Web page 280 in which the user is attempting to register a fourth-level domain name "stairway.heaven.enic.cc" 282 (which may be provided, for example, by a company such as eNIC Corporation that owns the "enic.cc" second-level domain name). FIGS. 2N and 2O illustrate possible Web pages 284 and 286 with alternative domain names that may be provided to the user if the specified domain name is already registered. In particular, as is illustrated in FIG. 2N, alternative domain names include domain names 292 in which the target word "stairway" in the first of the lower-level domain name portions is replaced with various options words (e.g., "staircase" and "flight of stairs"), domain names 291 in which the target word "heaven" in the second of the lower-level domain name portions is replaced with various option words (e.g., "holy city" and "celestial city"), domain names 293 in which target words in multiple lower-level domain name portions are replaced with option words, domain names 294 in which additional lower-level domain name portions are added that correspond to initial, intermediate, and ending option words (e.g., "my", "to", and "yes" respectively), and a domain name 295 in which the order of the lower-level domain name portions is modified. Note that target word "enic" in the third lower-level domain name portion is not replaced with related option words in the illustrated embodiment because the word is a proper name for which the DNAP system could not determine related words.

FIG. 2N similarly illustrates various alternative domain names in which one or more of the lower-level domain name portions is translated into another language, such as alternative 296 in which the first two lower-level domain names are translated into Spanish, alternatives 297 in which only one of the first three lower-level domain names is translated, alternatives 298 in which additional lower-level domain name portions are added and translated, and alternative 299 in which the first two lower-level domain name portions are translated and listed in reverse order. Those skilled in the art will appreciate that a variety of other types of alternative domain names could similarly be displayed.

Those skilled in the art will also appreciate that the techniques for identifying related alternatives to a textual identifier can be used in a variety of situations other than for domain names. For example, these techniques can similarly be used to identify alternative computer usernames and login names (e.g., when a desired username is not available to a new user), computer service identifiers (e.g., email addresses), passwords, mnemonic forms of telephone numbers (e.g., 1-800-FLOWERS), business names, trademarks, etc.

In addition, in the previous examples illustrations are provided of generating alternatives using related words that are translations or are synonyms or other words similar in meaning or concept. Those skilled in the art will appreciate that a wide variety of other types of related words can similarly be used, such as antonyms, homophones (e.g., "to" and "two"), acronyms (e.g., for the phrase "stairway heaven", "SH" or "sh" or "S-H"), hypernyms and hyponyms (e.g., a "tree" is a type of "plant" and a type of tree is a "maple"), meronyms and holonyms (e.g., an "engine" is part of an "automobile" and an engine includes parts such as a "carburetor"), metonyms (e.g., "father" and "child"), different morphological forms such as those based on singular/plural, tense, and syntactical part of speech. (e.g., for "sing", words such as "sings", "singing" "sang", "singer", and "singers"), idioms, and various other types of related words. In addition, any of a variety of defined classification systems can be used to identify words or concepts that are related to other words. As with translations and synonyms, words of each of the types can be determined in a variety of ways, such as by using predefined databases or third-party services.

The determination of the types of related words and other techniques to use when generating alternative domain names can also be determined in a variety of ways, such as based on the particular specified domain name, predefined system defaults, or preferences interactively specified by or stored for the user and/or the client device. If stored preference information is used, the information can be stored by the system or alternately could be stored on the client device (e.g., in a Web cookie for the DNAP system that is sent to the system when the user of the client device makes a Web-based request to register a domain name).

FIG. 2P provides an example of a Web page that can be provided to a user to interactively obtain preference information from the user, such as after the user makes the domain name registration request illustrated with respect to FIG. 2A but before Web page 210 illustrated in FIGS. 2B-2E is provided to the user. As is illustrated, the user can specify a variety of types of preferences, including those related to how the alternative domain names are to be generated, how the alternative domain names are to be displayed, automatic actions to take with respect to some or all of the alternative domain names, and whether or not the user-specified preference information should be stored and used for future domain name registration requests. In addition, in the illustrated embodiment the system charges for some of the types of possible services that it can provide (e.g., if providing the service involves using a third-party service that charges for its service), and the user can agree to pay for such desired services (e.g., to be deducted from a user account or included with the charge for registering one or more domain names). Those skilled in the art will appreciate that other types of preference information could similarly be presented to and specified by the user.

FIG. 3A illustrates an example of a portion of a database of related words used to generate alternative domain names. In particular, the illustrative database includes several illustrated entries that could be used to generate the group of alternative domain names 215 illustrated in FIG. 2B. Each of the entries 302-308 in the database corresponds to a target word, and have one or more synonym option words associated with it. For example, entry 306 corresponds to the target word "stairway", and the system will attempt to determine appropriate related words for this target word when the group of alternative domain names 215 is being generated for the domain name "stairway.cc". In the illustrated embodiment, a relevance rating threshold of 0.5 (on a scale of 0 to 1) is employed such that option words below the threshold will not be used.

Thus, in determining the related words for "stairway", the system will first retrieve the related option words listed in field 348 for entry 306, those being "stairs", "staircase", "moving stairway", "ghat", and "riser". In the illustrated embodiment, each related word has two associated pieces of information, the first being a numeric relevance rating, and the second being a diminisher value whose use is described below. Since the option word "riser" has a relevance rating of 0.4 that is below the threshold, it will be discarded. Thus, in some embodiments the system would return the option words "stairs", "staircase", "moving stairway", and "ghat" for "stairway", optionally with the associated relevance ratings.

In the illustrated embodiment, however, additional option words are considered by examining the related option words for each of the option words listed in field 348 of entry 306. Thus, considering the second listed option word "staircase", the system would then consider the option words in field 348 for entry 304 corresponding to the target word "staircase". Note that some option words may occur multiple times in different entries (e.g., "stairs" in entries 306 and 304), and may have different relevance ratings and/or diminisher values. In such situations, at most one copy of the option word will be returned, but the associated relevance rating for that copy can be determined in various ways, such as by using the highest associated relevance rating, an average, or the relevance rating associated with the first encounter of the word.

The diminisher value of an option word is used in the illustrated embodiment when recursively considering additional option words. In particular, the option word "staircase" for the target word "stairway" has an associated diminisher value of 0.9, and this value is used to reduce the relevance ratings and diminisher values of the option words associated with "staircase". While those skilled in the art will appreciate that the relevance ratings and diminisher values of such additional option words can be modified in a variety of ways in different embodiments, in the illustrated embodiment the diminisher value of "staircase" will be multiplied with the relevance ratings and diminisher values of each of the option words for the "staircase" target word entry. Thus, for the purposes of determining option words for "stairway", the first option word for the "staircase" target word will be treated as if it were "stairs, 0.9, 0.81;" and the last option word will be treated as if it were "flight of steps, 0.54, 0.45;". The option words for "stairway" then become, in order of their relevance rating, "stairs", "staircase", "backstairs", "moving staircase" "moving stairway", "flight of stairs", "flight of steps", and "ghat" (while "stairway" is an option word for "staircase", it is not included since it is the initial target word). This recursive generating of additional option words can similarly be performed for the other option words of "stairway".

Such generating of additional option words can continue if desired in a similar manner for each newly identified additional option word (e.g., for the option words of "staircase") until either a maximum number of option words have been identified (e.g., 5 or 50) or until no new options words above the threshold relevance rating are located. For example, the option word "backstairs" for "staircase" can be used to generate additional option words for "stairway". The effective diminisher value associated with "backstairs" will be 0.81 (0.9 for "staircase" times 0.9 for the "backstairs" entry). Thus, the first option word for "backstairs" will be treated as if it were "companionway, 0.729, 0.729;". After adding the option words for "backstairs" that are above the relevance rating, the option words for "stairway" become, in order of their relevance rating, "stairs", "staircase", "backstairs", "companionway", "moving staircase" "moving stairway", "fire escape", "emergency exit", "flight of stairs", "flight of steps", and "ghat".

Those skilled in the art will appreciate that related words could be stored in a variety of other ways, such as in a file rather than a database, and that additional types of information could also be stored (e.g., a category of related word if multiple different types of related words are stored together). Conversely, in some embodiments some of the illustrated types of information may not be stored (e.g., relevance ratings and/or diminishers) or may be stored in other associated data structures.

Figure 3B:
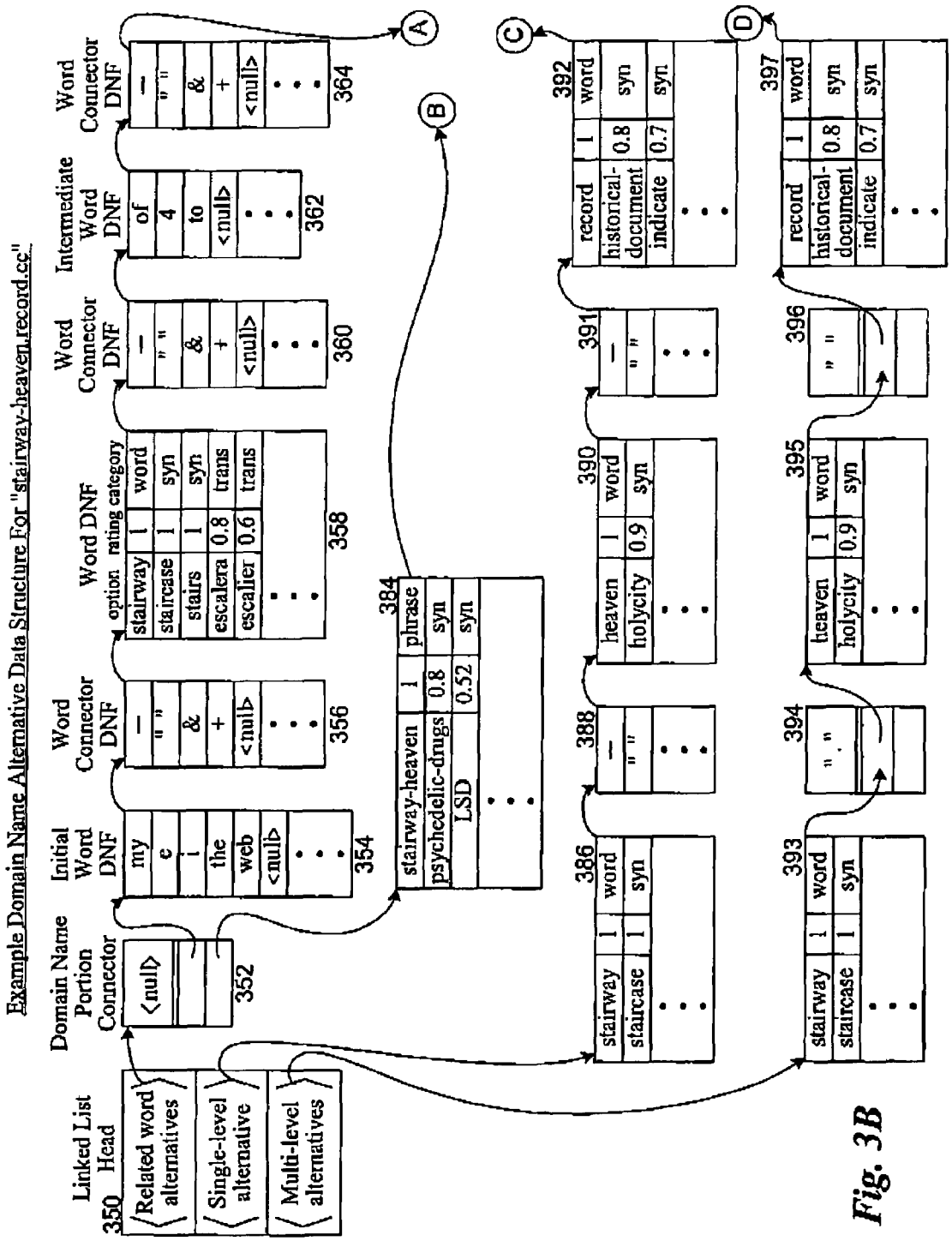
FIGS. 3B and 3C illustrate an example of a data structure used to generate alternative domain names.
Figure 3C:
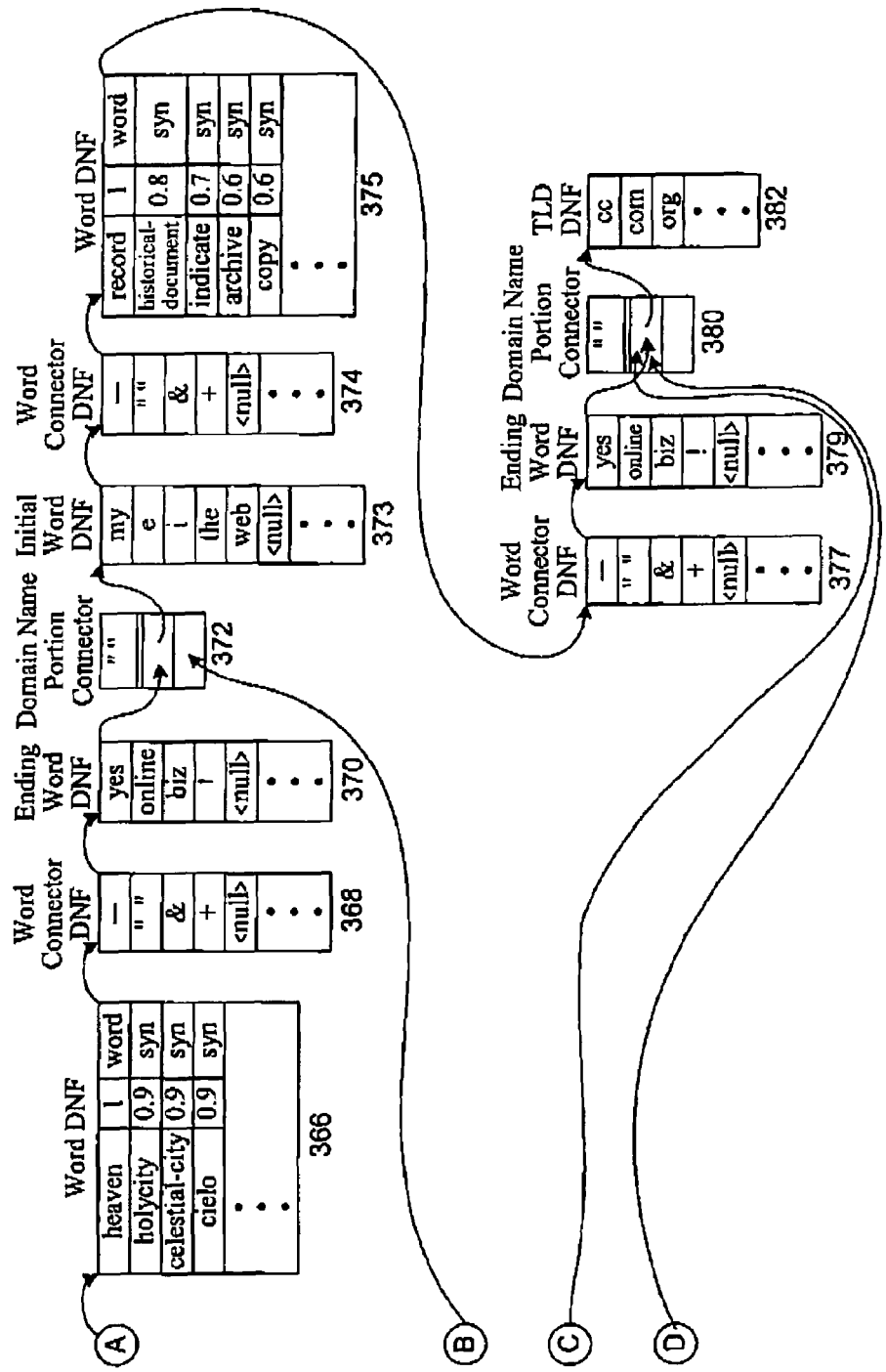
Figure 7:
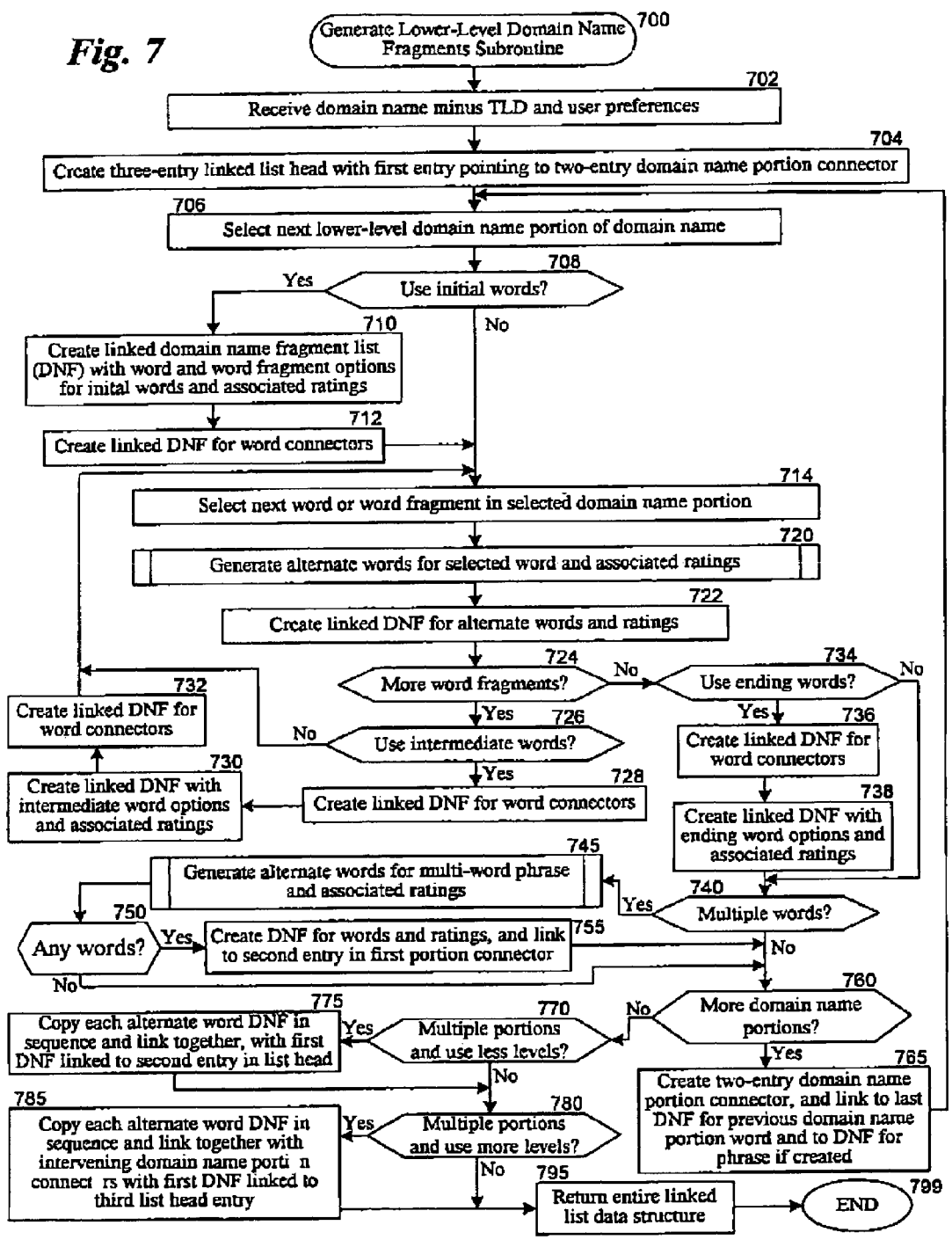
FIG. 7 is a flow diagram of an embodiment of the Generate Lower-Level Domain Name Fragments subroutine.

FIGS. 3B and 3C illustrate an example data structure used to generate alternative domain names for the domain name "stairway-heaven.record.cc", and the construction of a similar data structure is discussed with respect to FIG. 7. Those skilled in the art will appreciate, however, that alternative domain names can be generated a variety of ways, and that various other data structures could also be used for such generation. In the illustrated embodiment, a variety of types of alternative domain names will be generated. In particular, one such type of alternative domain name includes domain names having alternative option words that are generated for each of the target words "stairway" and "heaven" in the first domain name portion and for the target word "record" in the second domain name portion, as shown by the domain name fragment (DNF) data structures 358, 366 and 375. In addition, data structure 372 represents the transition between the first and second domain name portions, data structure 380 represents the transition between the second domain name portion and the top-level domain name portion, and data structure 382 represents multiple alternative TLDs. Various combinations of the option words and the TLDs can then be used to generate alternative domain names by selecting one choice from each of the data structures indicated.

For example, possible alternative domain names representing the noted data structures include "stairway-heaven.record.cc" (i.e., the specified domain name), "staircase-heaven.record.cc" (using a synonym option word for "stairway"), "stairway-cielo.record.cc" (using a translation option word for "heaven"), "stairway-heaven.archive.cc" (using a synonym option word for "record"), "stairway-heaven.record-.com" (using an alternative option for the TLD), and "staircase-cielo.archive.com" (using options words for each of the target words and an alternative for the TLD). Numerous other alternative domain names could similarly be generated.

In addition to the option words corresponding to the target words, optional additional initial, intermediate, and ending option words (as illustrated with data structures 354, 362, and 370) are also added to the first domain name portion and optional additional initial and ending option words (as illustrated with data structures 373 and 379) will be added to the second domain name portion. Intermediate option words are not used in the second domain name portion because there is only a single target word. In addition, optional connectors are also added to separate these additional option words from the other option words, as illustrated by data structures 356, 360, 364, 368, 374 and 377. These additional option words and connectors are referred to as optional because one of the choices in each of the data structures is "<null>", indicating that no value will be used for that data structure. The possible alternative domain names listed in the previous paragraph are based on the "<null>" options being used for each additional option word and word connector data structure.

If options other than "<null>" are chosen for at least some of the additional option word and word connector data structures, possible alternative data structures include "my-stairway-heaven.record.cc" (the specified domain name with an initial word and word connector), "staircase-heaven+biz.record.cc", "stairway-to-ceilo.record.cc", "stairway-heaven.my-archive+biz.cc", and "my-stairway-to-heaven+biz.my-record+biz.com". Numerous other alternative domain names could similarly be generated. It should be noted that the illustrative embodiment includes some characters that may not be supported by some or all domain name registration services, such as word connectors "&" and " ".

The data structures corresponding to the target words include relevance ratings and category information associated with each option word. In this illustrated embodiment, the relevance ratings range between 0 and 1, with 1 indicating the highest relevance level. Relevance ratings can be determined for an alternative domain name by combining the relevance ratings for each part of the alternative domain name that has an associated relevance rating. For example, with the alternative domain name "stairway-cielo.record.cc", the relevance ratings for the option words "stairway", "cielo", and "record" (i.e., 1, 0.9 and 1 respectively) could be combined. The values could be combined in a variety of ways, such as by using an average, sum, or product of the various values. In other embodiments, relevance ratings and category information could also be associated with the additional option words and word connectors, and other types of information could similarly be included in all of the data structures. Conversely, in other embodiments no relevance ratings and category information may be included in any of the data structures.

The previously described method, that of generating alternative domain names by using option words as alternatives for target words on a word-by-word basis, represents one way in which alternatives can be generated, but another related way is by using option words that reflect phrases in domain name portions of the specified domain name. For example, imagine that the phrase "stairway heaven" is slang for psychedelic drugs such as LSD. If so, data structure 384 can hold option words that correspond to this phrase in the first lower-level domain name portion, and can be used in a similar manner to that of the other data structures. Thus, another possible alternative domain name could be "psychedelic-drugs.archive.cc". Since the second lower-level domain name portion has only a single target word, it does not have a corresponding phrase DNF. While not included in the illustrated embodiment, such phrase DNFs could also have additional initial and ending option words and corresponding word connectors.

Data structures 386-392 and 393-398 represent two other types of alternative domain names. In particular, the first of these groups of data structures represents converting the specified domain name into a second-level domain name, and the second of these groups of data structures represents converting the specified domain name into a multi-level domain name (with the number of levels equal to the number of target words plus one additional level for the TLD). In the illustrated embodiment, the first group of data structures are created by copying the DNFs for the target words and separating them with word connector DNFs, and the second group of data structures are copies of the same target word DNFs separated by domain name portion connectors. Thus, the first group of data structures could provide the alternative domain name "stairway-holycity-archive.cc", and the second group of data structures could provide "stairway.holycity.archive.cc". While not included in the illustrated embodiment, additional initial, intermediate and ending option words and corresponding word connectors could also be added to the data structures in the first group, and additional initial, intermediate and ending option words and domain name portion connectors could be added to the data structures in the second group.

Figure 4:
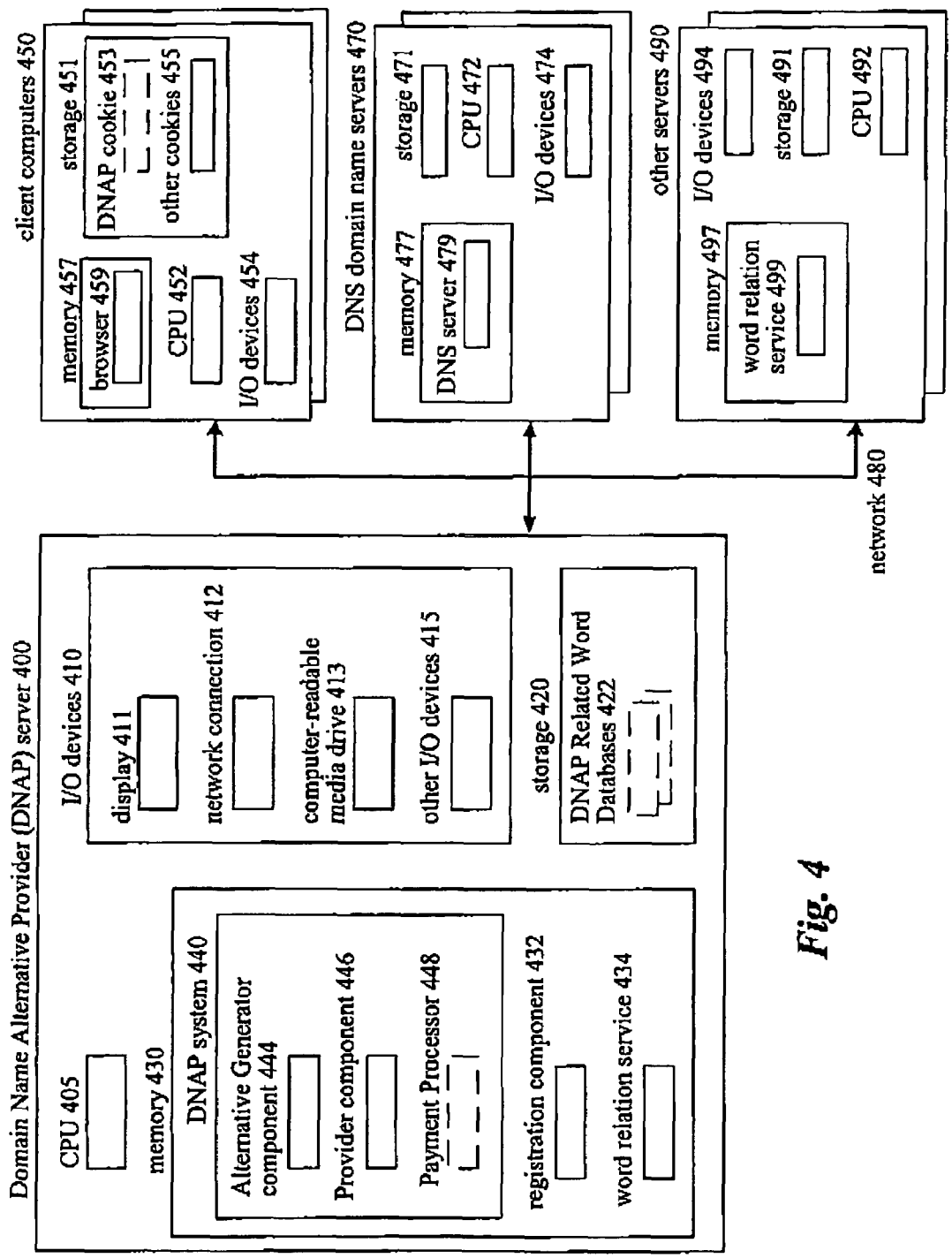
FIG. 4 is a block diagram illustrating an embodiment of the disclosed Domain Name Alternative Provider system.

FIG. 4 illustrates a server computer 400 suitable for executing an embodiment of the DNAP system 440, DNS domain name servers 470 suitable for providing DNS domain name resolution services, various Web and other servers 490 for providing Web contents and other services to clients, and various client computers 450 which can access the Web servers, domain name servers, and DNAP system.

The client computers include storage 451 (e.g., a hard drive), a CPU 452, I/O devices 454, and memory 457. A Web browser 459 is executing in the memory, and Web browser cookies are present on the storage, including a cookie 453 containing information related to the DNAP system and other cookies 455. In addition, the I/O devices include various input and output devices (not illustrated) with which a user (not illustrated) of the client can interact with the Web browser and with which the Web browser can present information to the user, such as a mouse and a display. For example, the user can interact with the Web browser to request and receive Web content (e.g., Web pages) from one or more of the Web servers 490.

The illustrated DNS domain name server 470 includes storage 471 that stores domain name information for registered domain names (not illustrated), a CPU 472, and various I/O devices 474. A memory 477 includes executing DNS server software 479 that can receive domain name resolution requests and provide corresponding IP address information from the domain name information for the registered domain names.

The illustrated server 490 includes a CPU 492 and various I/O devices 494, and can include various Web content stored on storage 491 (not illustrated) that can be provided to clients. The illustrated server also includes word relation service software 499 that is executing in memory 497 and that can provide services (e.g., a translation service) to a requester.

The user of the client can also interact with the Web browser to attempt to register new domain names, such as from a domain name registration component executing on an accessible computer such as server 400. In the illustrated embodiment, the registration service determines that a requested new domain name is not available, and interacts with the DNAP system to determine alternative domain names. In some embodiments the DNAP system will be part of or operate in conjunction with a particular registration component, while in other embodiments the DNAP system will interact with multiple different registration components.

The DNAP system executes in memory 430 of the illustrated DNAP server 400, with the server additionally including a CPU 405, various I/O devices 410 (including a display 411, a network connection 412, a computer-readable media drive 413, and other I/O devices 415), and storage 420. The DNAP system includes an Alternative Generator component 444 that receives an indication of a specified domain name (e.g., from a registration component) and determines alternative domain names. The Alternative Generator can generate alternative domain names in a variety of ways, including by using one or more databases of related words (e.g., DNAP Related Word Databases 422 on storage 420) and by interacting with one or more word relation services (e.g., word relation service 434 executing in memory 430 or word relation service 499 on another server). In addition, the Alternative Generator can determine how to generate and provide alternative domain names in a variety of ways, such as by using preference information associated with the user or the client (e.g., from a DNAP cookie 453 included with the user's domain name registration request, or by interactively querying the user for preference information).

After alternative domain names are generated, a Provider component 446 of the DNAP system provides the alternative domain names in an appropriate manner. In some embodiments, the DNAP system will provide the alternative domain names to a registration component that provided the specified domain name, while in other embodiments the DNAP system will interact directly with the user and present alternative domain names to the user. In addition, the DNAP system can include an optional Payment Processor component 448 that can charge the user for services provided if appropriate and can supply payment to third-party services (e.g., a word relation service) if needed.

When the Web browser 459 receives information to be displayed (whether directly from the DNAP system or from a registration component), the browser presents the information to the user. In some situations, the presented Web content will allow interaction by the user, such as by including alternative domain names that the user can select for registration or a request for preference information.

In some embodiments, the DNAP system may be operated by a registrar for a TLD, such as the ".cc" TLD. In particular, if such a registrar is a primary registrar for a TLD, then the registrar may be able to provide additional services to users, such as reserving available domain names for limited periods of time without registering them.

Those skilled in the art will appreciate that computer systems 400, 450, 470 and 490 are merely illustrative and are not intended to limit the scope of the present invention. The computer systems may be connected to other devices that are not illustrated, including through one or more networks such as the Internet or via the World Wide Web (WWW). In addition, the functionality provided by the illustrated DNAP system components may in some embodiments be combined in fewer components or distributed in additional components. Similarly, in some embodiments the functionality of some of the illustrated components may not be provided and/or other additional functionality may be available. For example, while the illustrated DNAP system includes both the DNAP Alternative Generator component and DNAP Provider component, in other embodiments only one of the components may be present.

Those skilled in the art will also appreciate that, while the various components of the DNAP system are illustrated as being stored in memory while being used, these items or portions of them can be transferred between memory and other storage devices for purposes of memory management and data integrity. Similarly, while the various stored databases and other information are illustrated as being present on storage while being used, those skilled in the art will appreciate that these items, or portions of them, can instead be present in memory and transferred between storage and memory. The DNAP components may also be stored as instructions on a computer-readable medium, such as a hard disk, a memory, a network, or a portable article to be read by an appropriate drive. Similarly, the data structures of the DNAP system may also be stored on a computer-readable medium, such as the various databases. The DNAP system instructions and data structures can also be transmitted as generated data signals (e.g., as part of a carrier wave) on a variety of computer-readable transmission mediums, including wireless-based and wired/cable-based mediums. Accordingly the present invention may be practiced with other computer system configurations.

In some embodiments, a client system communicates with a server system in order to send HTTP requests and receive Web pages from the server over the Internet. One skilled in the art will appreciate, however, that the techniques of the DNAP system can be used in various environments other than the Internet. Also, various communication channels may be used, such as a local area network, a wide area network, or a point-to-point dialup connection. In addition, a "client", "server" or "host" may comprise any combination of hardware or software that can interact, including computers, network devices, internet appliances, PDAs, wireless phones, pagers, electronic organizers, television-based systems and various other consumer products that include inter-communication capabilities. While Web pages are often constructed using HTML, other methods can be used to create such pages, such as Java, XML, HDML, WML, CGI scripts, etc. Similarly, communication protocols other than HTTP can be used, such as WAP, TCP/IP, or FTP, as well as a variety of inter-device communication mechanisms, including CDPD, CDMA, GSM, PDC, PHS, TDMA, FLEX, ReFLEX, iDEN, TETRA, DECT, DataTAC, Mobitex, etc. Both the client and the server system can also operate on a wide variety of operating system types (e.g., Windows, Linux, Unix, MacOS, BEOS, PalmOS, EPOC, Windows CE, FLEXOS, OS/9, JavaOS, etc.), and need not share the same operating system.

Figure 5:
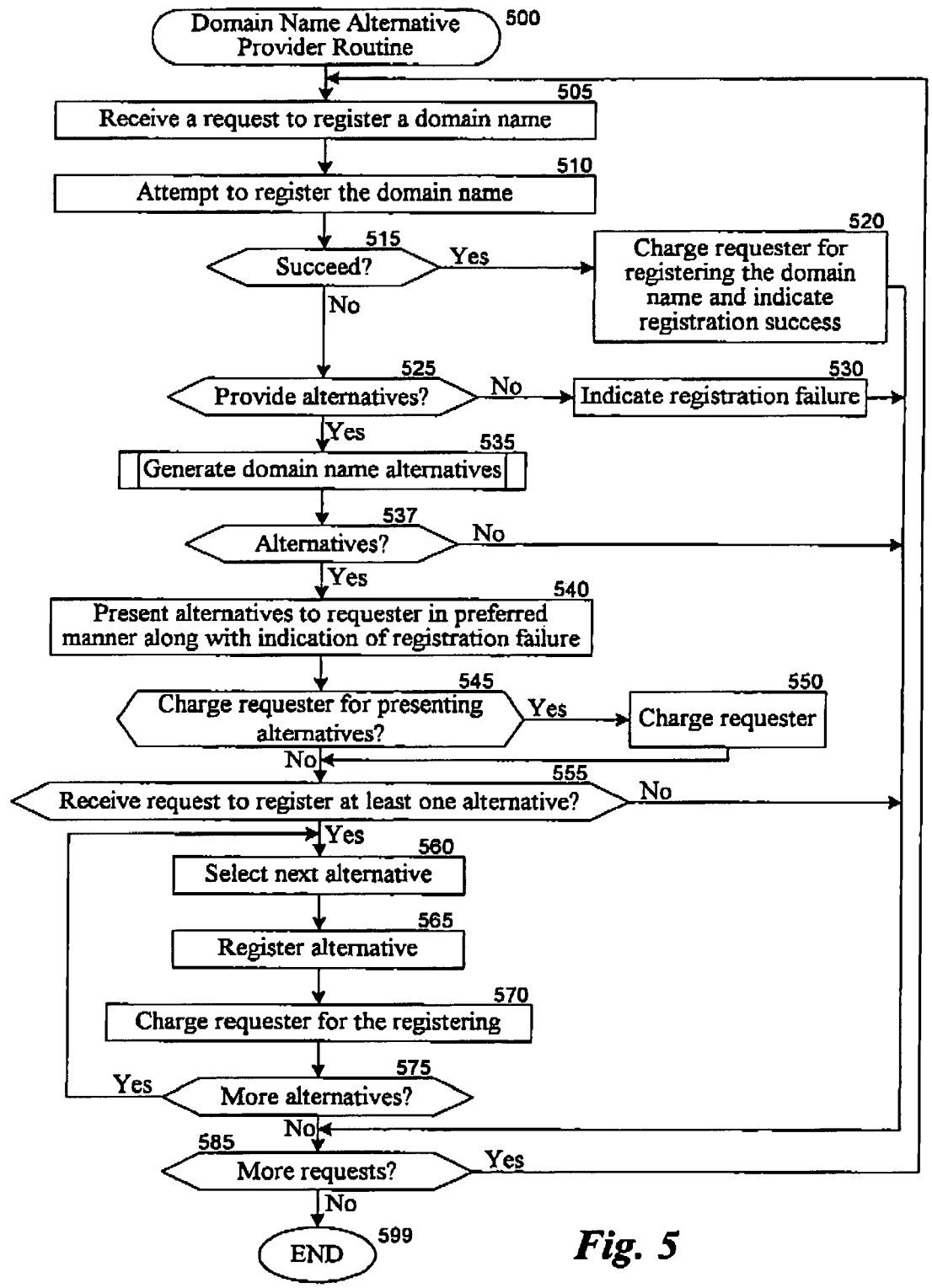
FIG. 5 is a flow diagram of an embodiment of the Domain Name Alternative Provider routine.

FIG. 5 is a flow diagram of an embodiment of the Domain Name Alternative Provider routine 500. The routine receives a request from a user to register a domain name, determines that the domain name is not available to be registered, determines alternative domain names that are related to the domain name and that are available to be registered, presents the alternative domain names to the user, and registers one or more of the alternative domain names if so instructed by the user. In the illustrated embodiment, the routine is performed by a registrar that has the ability to register domain names, but in other embodiments the routine could merely generate alternative domain names without attempting to register any domain names.

The routine begins at step 505 where it receives a request to register a domain name, and then continues to step 510 to attempt to register the domain name. If it is determined in step 515 that the registration attempt succeeded, the routine continues to step 520 to indicate to the user that the attempt was successful and to charge the user for the registration. If the attempt was not successful, the routine continues instead to step 525 to determine whether to generate and provide alternative domain names to the user. This determination could be based on the particular domain name specified, on general system defaults, or on preference information for the user. In some embodiments, preference information can be obtained for the user via an interactive query, while in other embodiments stored preference information for the user may be available (e.g., from a cookie provided with an HTTP message used to make the initial registration request). If it is determined that alternatives are not to be provided, the routine continues to step 530 to indicate the registration failure for the specified domain name to the user.

If it is instead determined to provide alternatives, the routine continues to step 535 to execute a subroutine to generate available domain name alternatives for the specified domain name. The routine then continues to step 537 to determine if any alternatives were identified. If so, the routine continues to step 540 to present the alternatives to the user, such as in an interactive Web page from which the user can select one or more alternative domain names to register. In addition, user-specified preference information can be used, if available, to determine how to present the alternatives (e.g., how many alternatives to present, the manner in which the alternatives are grouped or organized, whether or not to include relevance ratings, etc.). In some embodiments, the routine could additionally provide various services to the user with respect to the alternative domain names, such as temporarily reserving the alternative domain names while they are presented to the user so that they will be available if the user decides to select one or more of the domain names within a certain amount of time, or automatically registering one or more of the alternative domain names (e.g., based on user-specified preference instructions to register alternative domain names that have a relevance rating over 90 percent).

After presenting the alternatives, the routine continues to step 545 to determine whether to charge the user for providing the service of presenting the alternative domain names. In this embodiment, the user will be charged only if available domain names are identified, while in other embodiments the user could be charged for the attempt to generate alternative domain names even if no such available domain names are identified. Alternately, in other embodiments the user may not be charged for any services provided by the DNAP system. If it is determined that the user is to be charged, the routine continues to step 550 to charge the user. After step 550, or if the user was not charged, the routine continues to step 555 to determine if the user desires to register at least one of the alternative domain names (e.g., based on whether the user selects one or more of the alternative domain names in the Web page that was presented to the user). If so, the routine continues to step 560 to select the next alternative domain name identified by the user, beginning with the first. In step 565, the routine then registers the alternative domain name, and in step 570 charges the user for the registering. In step 575 the routine determines if there are more alternative domain names to be registered, and if so returns to step 560. If not, or after steps 520 or 530, or if steps 537 or 555 were determined in the negative, the routine continues to step 585 to determine if there are more requests to be processed. If so, the routine returns to step 505, and if not the routine continues to step 599 and ends.

Figure 6:
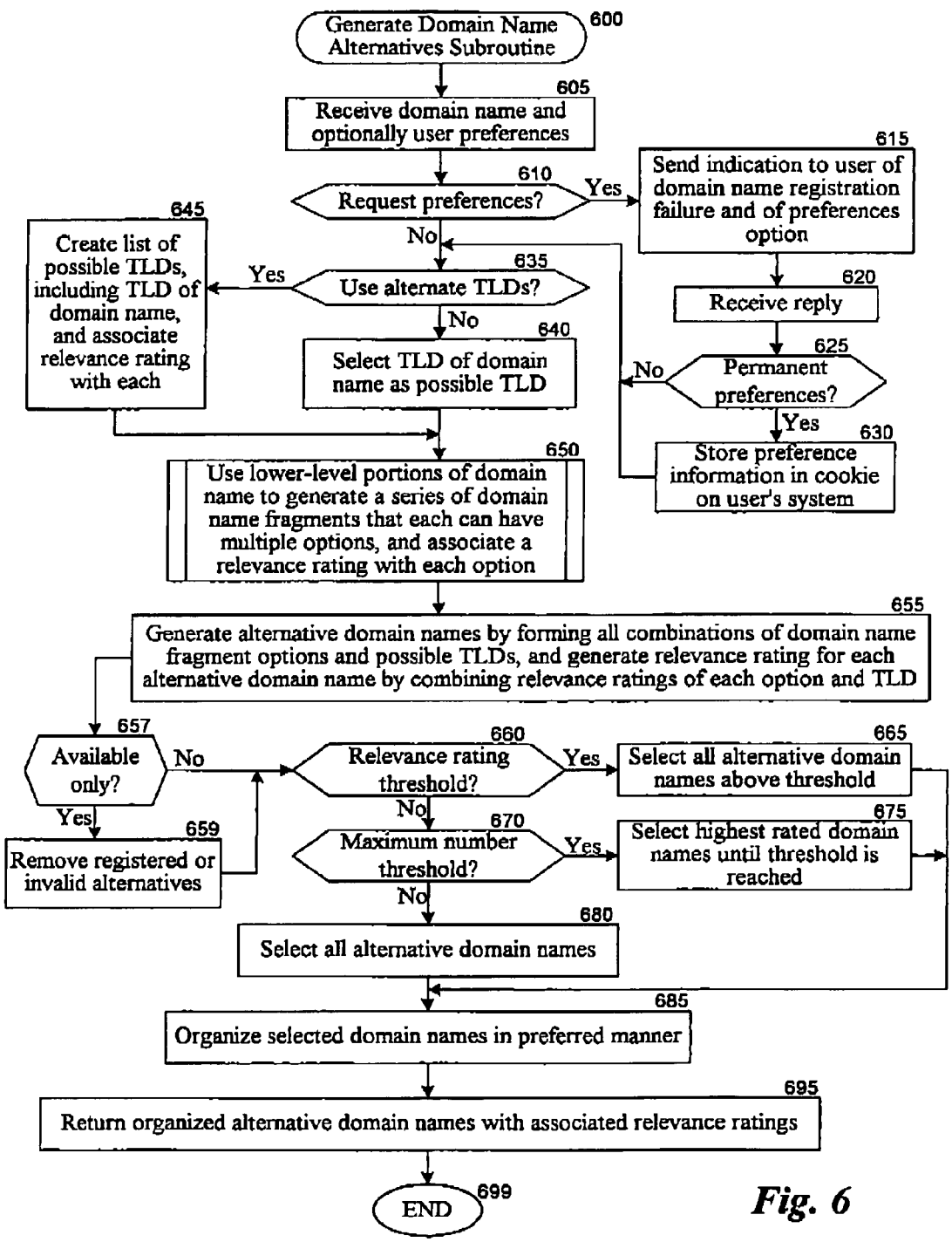
FIG. 6 is a flow diagram of an embodiment of the Generate Domain Name Alternatives subroutine.

FIG. 6 is a flow diagram of an embodiment of the Generate Domain Name Alternatives subroutine 600. The routine receives an indication of a specified domain name and optionally of user preferences, generates alternative domain names for the specified domain name, selects the alternative domain names that satisfy the specified preferences, and returns the selected alternative domain names along with associated relevance ratings. The subroutine begins at step 605 where it receives a specified domain name and optionally receives user preferences. The subroutine continues to step 610 where it determines whether to request preferences interactively from the user, such as if no optional preference information was received. If so, the subroutine continues to step 615 where it sends an indication to the user of the failure of the registration for the specified domain name and includes one or more requests for preference information. The subroutine continues to step 620 where it receives a reply from the user indicating specified preference information or an instruction to use default preference information. If it is determined in step 625 that the user-specified preference information includes an instruction to store the preference information for future use, the subroutine continues to step 630 where it stores the preference information in a cookie on the user's system.

After step 630, or if the preference information was not stored for future use or if no preference information was requested, the subroutine continues to step 635 to determine if the available preference information indicates to use alternate top-level domains when generating the alternative domain names. If so, the subroutine continues to step 645 to create a list of possible TLDs (including the TLD of the specified domain name), and associates relevance ratings with the TLDs. If not, the subroutine continues to step 640 to select the TLD of the specified domain name as the only possible TLD and associates the highest possible relevance rating with the TLD. After steps 640 or 645, the subroutine continues to step 650 to execute a subroutine that generates alternative domain name portions for the lower-level domain name portions of the specified domain name, and returns the alternatives along with relevance ratings for the alternatives. The subroutine then continues to step 655 to generate alternative domain names by forming all combinations of each of the alternative lower-level domain name portions and alternative TLDs, and determines relevance ratings for each of the alternative domain names. As indicated previously, relevance ratings for different domain name portions in an alternative domain name can be combined together in a variety of ways to generate a relevance rating for the alternative domain name.

The subroutine then continues to step 657 to determine if only available alternative domain names are to be provided, and if so continues to step 659 to remove alternative domain names that are registered or otherwise unavailable. After step 659, or if unavailable alternative domain names are also to be included, the subroutine continues to step 660 to determine if a relevance rating threshold is specified in the preference information. If so, the subroutine continues to step 663 to select all of the alternative domain names above the threshold. If not, the subroutine continues to step 670 to determine if a threshold for a maximum number of alternative domain names is specified in the preference information, and if so continues to step 675 to select the highest rated domain names until the maximum number threshold is reached. If there is not a maximum number threshold or a relevance rating threshold, the subroutine continues to step 680 to select all of the alternative domain names. After steps 665, 675, or 680, the subroutine continues to step 685 to organize the selected domain names in a manner indicated in the preference information, such as by ordering alternative domain names by relevance rating or grouping them in categories based on how the alternative domain name was generated. After step 685, the subroutine continues to step 695 to return the organized alternative domain names along with their associated relevance ratings, and then continues to step 699 and ends.

FIG. 7 is a flow diagram of an embodiment of the Generate Lower-Level Domain Name Fragments subroutine 700. The routine receives an indication of one or more lower-level domain name portions and of preference information related to the generation of alternatives for those domain name portions, and creates various alternatives of various types for the domain name portions as indicated by the preferences. The subroutine begins at step 702 where the lower-level domain name portions and the preference information is received.

The subroutine continues to step 704 where the head of a linked list data structure is created, with the data structure having three entries corresponding to different types of alternatives. As explained in greater detail below, the first entry corresponds to alternatives in which each lower-level domain name portion has its own alternatives that are generated separately from other lower-level domain name portions. When there are multiple lower-level portions, these separate alternatives for each of the lower-level portions can then be combined in various combinations to create the alternatives for the combined multiple lower-level portions. In addition, in the illustrated embodiment there are two different types of ways in which alternatives are generated for each lower-level domain name portion separately, and thus the first entry of the linked list head data structure points to a second domain name portion connector data structure having two entries that will point respectively to data structures corresponding to the two different ways. In the first way, each target word in a lower-level domain name portion will be individually replaced by various alternative option words, while in the second way multiple target words are combined together as a phrase and option words are generated for the phrase. Those skilled in the art will appreciate that if a particular lower-level domain name portion does not have multiple target words with corresponding option words (e.g., a lower-level portion with a single target word), then alternatives will not be generated in the second way for that domain name portion.

While the first entry of the linked list head data structure corresponds to separate alternatives for each lower-level domain name portion, the second entry of the data structure corresponds to generating various alternatives for converting multiple lower-level domain name portions into a single lower-level domain name portion. Conversely, the third entry of the data structure corresponds to generating various alternatives for converting at least one of the lower-level portions with multiple target words into multiple lower-level domain name portions. Those skilled in the art will appreciate that if multiple lower-level domain name portions are not present, then data structures for the second entry may not be generated, and similarly that if multiple target words are not present in any lower-level domain name portion then data structures for the third entry may not be generated.

After step 704, the subroutine continues to step 706 to select the next lower-level domain name portion that was specified, beginning with the first. The subroutine then continues to step 708 to determine if the preference information indicates that additional initial option words are to be used. If so, the subroutine continues to step 710 to create a domain name fragment (DNF) list data structure that includes option words for initial words and corresponding relevance ratings for those option words. The created DNF data structure is linked into the existing data structure by having a previous data structure point to the newly created data structure, such as the first entry of the second created data structure that has two entries. The subroutine then continues to step 712 to create a DNF representing word connectors, and links the DNF into the existing data structure (e.g., by having the initial word DNF point to the word connector DNF).

After step 712, or if initial words are not being used, the subroutine continues to step 714 where the next target word in the selected domain name portion is selected, beginning with the first. The subroutine then continues to step 720 to execute a subroutine to generate option words and associated relevance ratings for the target word, and in step 722 creates a DNF list data structure to hold the option words and relevance ratings and then links the DNF into the existing data structure. Those skilled in the art will appreciate that in other embodiments additional information may be stored in such data structures, such as category information indicating the type of option word.

The subroutine then continues to step 724 to determine if there are more target words in the selected domain name portion, and if so continues to step 726 to determine from the preference information if additional intermediate option words are to be used. If so, the subroutine continues to step 728 to create and link a DNF for connectors, to step 730 to create and link a DNF for intermediate word options and associated relevance ratings, and to step 732 to create and link another DNF for connectors. After step 732, or if intermediate words are not being used, the subroutine returns to step 714 to select the next target word. If it was instead determined in step 724 that there are no more target words in the selected domain name portion, the subroutine continues to step 734 to determine from the preference information if ending words are to be used. If so, the subroutine continues to step 736 to create and link a DNF for connectors, and then to step 738 to create and link a DNF for additional ending word options along with associated relevance ratings.

Those skilled in the art will appreciate that generating alternatives for additional option words (such as initial, intermediate, and ending option words) and for word connectors, as well as determining associated relevance ratings for such options, can be performed a variety of ways. For example, in some embodiments predetermined option words can be defined and used for each type of additional option word and for connectors. Alternately, preference information could indicate some or all of the option words to use, or third-party services could be used to provide such information.

After step 738, or if it was determined in step 734 that ending words are not being used, the subroutine continues to step 740 to determine if there are multiple target words in the selected domain name portion. If so, the subroutine will treat the multiple target words as a potential phrase, and will continue to step 745 where the option word generating subroutine will be executed to attempt to determine option words and associated relevance ratings that correspond to the phrase of target words. Thus, if three or more target words are included in the selected domain name portion, the illustrated embodiment will attempt to determine option words for the phrase including all three of the target words. In alternate embodiments, option words could also be generated for sub-phrases, such as the first and second target word, the first and third target word, etc. After step 745, the subroutine continues to step 750 to determine if any option words were identified. If so, the subroutine continues to step 755 to create a DNF for the option words and their associated relevance ratings, and links the DNF to the second entry in the previously created domain name portion connector.

After step 755, or if it was determined in step 740 that there were not multiple target words or in step 750 that no option words were identified, the subroutine continues to step 760 to determine if there are more domain name portions to process. If so, the subroutine continues to step 765 to create a new domain name portion connector data structure with two entries, and to link the entries in the data structure to the last DNFs produced by the word-by-word and phrase processing for the selected domain name portion. The subroutine then returns to step 706 to select the next lower-level domain name portion.

If it was instead determined that there are no more domain name portions, the subroutine continues to step 770 to determine if multiple lower-level portions are present and if the preference information indicates to generate alternative domain names having only a single lower-level portion. If so, the subroutine continues to step 775 to generate alternatives for a single lower-level domain name portion that includes an option word for each of the target words in all of the multiple lower-level domain name portions. In particular, each of the DNF data structures for target words are copied and are linked together in the order of their occurrence, with the first such DNF data structure copy linked to the second entry in the initial linked list head data structure.

After step 775, or it was determined in step 770 that alternatives for a single lower-level domain name portions were not to be generated, the subroutine continues to step 780 to determine if multiple target words are present in at least one of the lower-level domain name portions and if the preference information indicates to generate alternative domain names having additional lower-level portions. If so, the subroutine continues to step 785 to generate alternatives in which a single target word is used in each of multiple lower-level domain name portions. In particular, each of the DNF data structures for target words are copied and are linked together in the order of their occurrence and with intervening domain name portion connector data structures, with the first DNF data structure copy linked to the third entry in the initial linked list head data structure. Those skilled in the art will appreciate that in alternate embodiments, additional option words and/or word connectors could also be used with the sequences of word DNFs linked together in steps 775 and 785.

After step 785, or if it was determined in step 780 that alternatives with additional lower-level domain name portions are not to be generated, the subroutine continues to step 795 to return the entire created linked list data structure, and then continues to step 799 and ends.

Figure 8:
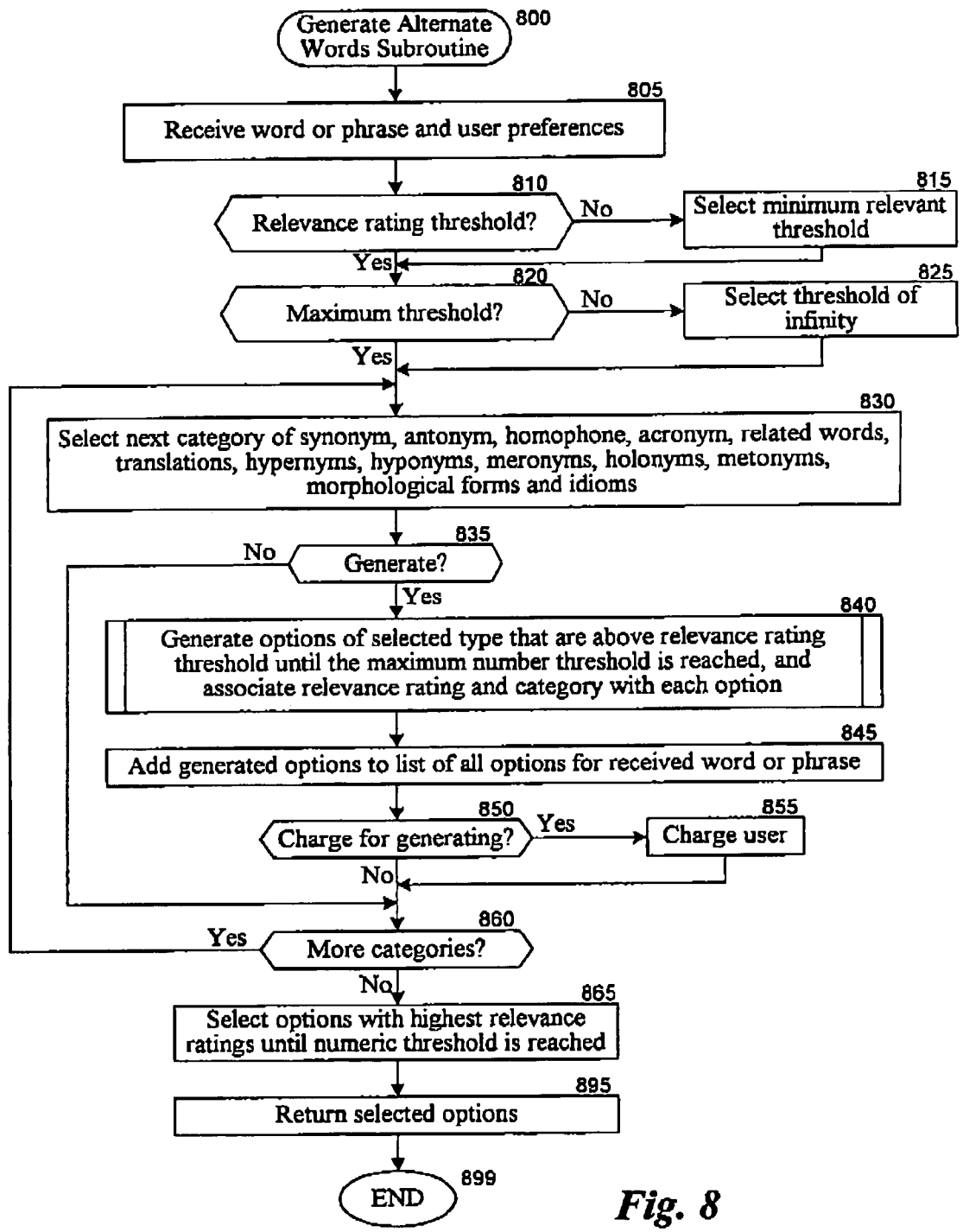
FIG. 8 is a flow diagram of an embodiment of the Generate Alternate Words subroutine.

FIG. 8 is a flow diagram of an embodiment of the Generate Alternate Words subroutine 800. The subroutine receives an indication of a target word and of preference information, generates various types of option words for the target word, and selects the appropriate option words to return. The subroutine begins in step 805, where it receives an indication of a target word and of preference information. The subroutine then continues to step 810 to determine if a relevance rating threshold is specified in the preference information, and if not continues to step 815 to select a minimum default relevance rating threshold (e.g., the lowest possible relevance rating). After step 815, or if a relevance rating threshold was specified, the subroutine continues to step 820 to determine if a maximum number threshold was specified in the preference information, and if not then continues to step 825 to select a maximum threshold rating for the system (e.g., the highest possible number that the system can handle, or infinity).

After step 825, or if a maximum threshold was specified in the preference information, the subroutine continues to step 830 to select the next of a series of various types or categories of related words that the system can determine for the target word, beginning with the first category. In the illustrated embodiment, categories of related words includes synonyms, antonyms, homophones, acronyms, words related in meaning but not synonymous, translations, hypernyms, hyponyms, meronyms, holonyms, metonyms, various morphological forms, and idioms. After step 830, the subroutine continues to step 835 to determine if the preference information indicates to generate option words of the selected type, and if not continues to step 860.

If the subroutine is to generate such options words, however, the subroutine continues to step 840 to execute a subroutine to generate option words of the selected type for the target word along with associated relevance ratings. The subroutine is supplied with the relevance rating and maximum number thresholds, and the returned option words will have associated relevance ratings above the relevance rating threshold and will number not more than the maximum number threshold. After step 840, the subroutine continues to step 845 to add the generated option words to a list of all option words for the target word. In step 850, the subroutine determines if the user is to be charged for generating option words of the selected type, and if so continues to step 855 to charge the user an appropriate amount. After step 855, or if there was no charge for the generating, the subroutine continues to step 860 to determine if there are more categories of options words to select, and if so returns to step 830.

If there are not more categories, the subroutine continues to step 865 to select the options with the highest relevance ratings until the maximum number threshold is reached, and then continues to step 895 to return the selected option words and associated relevance ratings. The subroutine ends in step 899.

Figure 9:
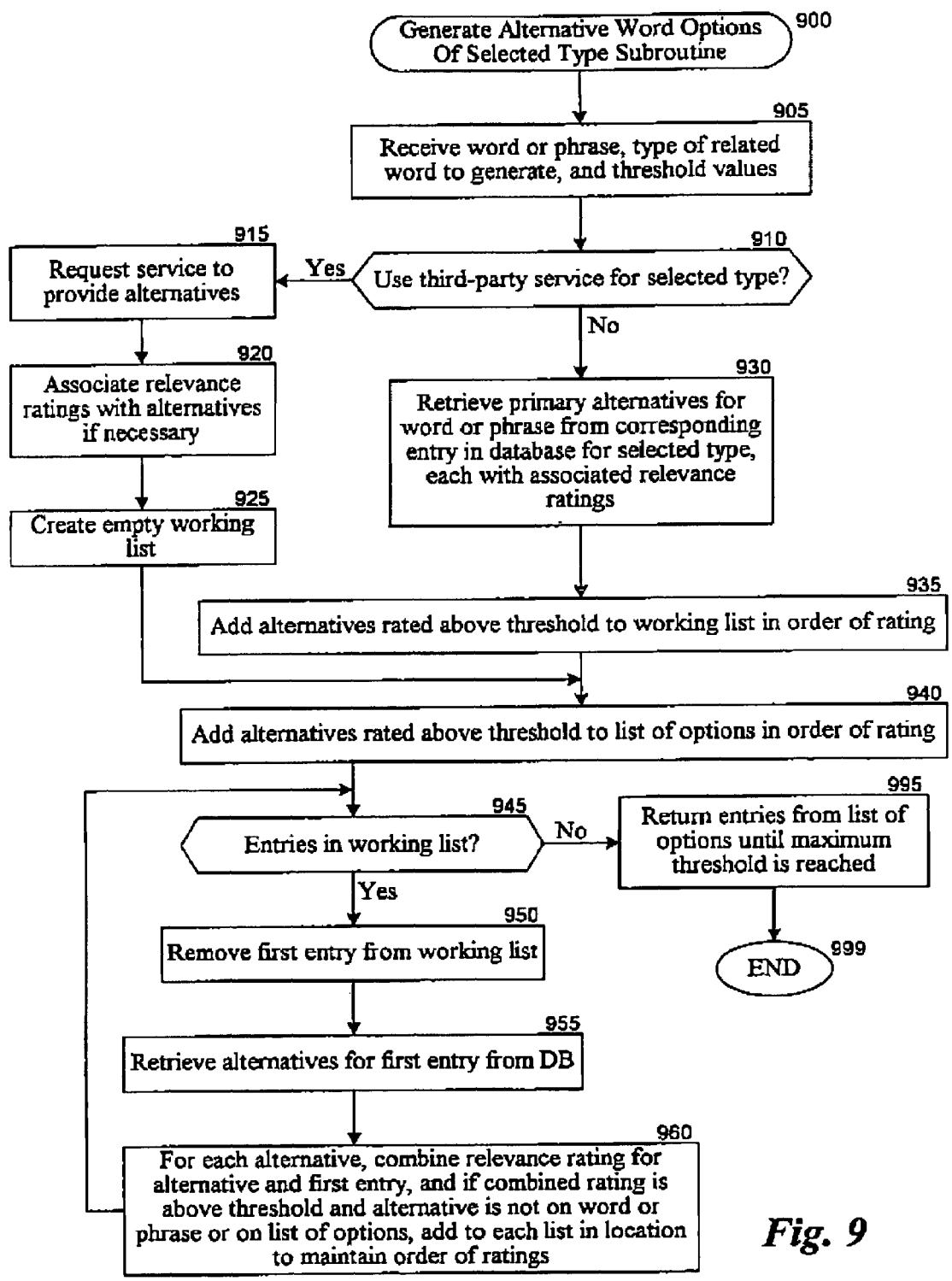
FIG. 9 is a flow diagram of an embodiment of the Generate Alternate Word Options Of Selected Type subroutine.

FIG. 9 is a flow diagram of an embodiment of the Generate Alternate Word Options Of Selected Type subroutine 900. The subroutine receives an indication of a target word, of a category of option word to determine for the target word, and of thresholds for relevance ratings and for a maximum number of option words, and then generates and returns appropriate option words. The subroutine begins in step 905 where the input information is received, and continues to step 910 to determine whether to use a third-party service to generate option words of the specified category (e.g., based on preference information or if this embodiment of the system does not have its own capability to generate such option words). If so, the subroutine continues to step 915 to request such a service to provide alternative option words of the specified category. In step 920 the subroutine receives the option words and determines relevance ratings to be associated with them if the third-party service did not provide such relevance ratings. In step 925, the subroutine then creates an empty working list.

If it was instead determined in step 910 that a third-party service is not to be used, the subroutine continues to step 930 to retrieve alternative option words for the target word from an entry for the target word in a database containing related words of the specified category, as well as retrieving relevance ratings associated with each such option word. In step 935, the subroutine then creates a working list of additional words to be processed that includes each of the option words that have a relevance rating above the relevance rating threshold. After steps 925 or 935, the subroutine continues to step 940 to add the alternative generated option words that have relevance ratings above the relevance rating threshold to a list of possible option words to return, with the option words listed in the order of their ratings. The subroutine then continues to step 945 to determine if there are any entries in the working list, and if not continues to step 995 to return the entries in the list of possible option words up to the maximum number threshold of option words. After step 995 the subroutine ends.

If it was instead determined that there are entries in the working list, the subroutine continues to step 950 to remove the first entry from the working list, and then in step 955 retrieves alternative option words for that entry, such as from the database holding the related words of the specified category. In step 960, the subroutine then determines a relevance rating for each retrieved option word by combining the relevance rating listed in the database entry with a relevance modifier value (e.g., a diminisher value, or the relevance rating itself) for the first entry that is temporarily acting as a target word. For those option words whose determined relevance ratings are above the relevance rating threshold, if the option word is not the original target word or not already on the list of possible options words, then the option word and its associated determined relevance rating are added to both the working list and the list of possible option words in such a manner so as to maintain the list entries in order of their associated relevance ratings. The subroutine then returns to step 945 to determine if additional entries are present in the working list. Those skilled in the art will appreciate that in some embodiments the subroutine could stop generating additional alternative option words even if entries remain in the working list, such as after the list of possible option words reaches a certain number or after the subroutine has reached a certain number of recursive levels from the original specified target word.

Those skilled in the art will also appreciate that other embodiments could include additional functionality or services provided by the DNAP system. For example, if databases of related words are stored and used, the DNAP system could interactively expand such databases or alter relevance ratings for option words in the databases based on tracked user behavior. For example, user choices of alternative domain names could be tracked, and the relevance ratings for the option words used in those alternatives could be increased based on such selection. Similarly, if users can edit alternative domain names that are provided or specify a new possible domain name that is closely related to a previous unsuccessful registration attempt, the DNAP system could attempt to determine new target words that the user has specified which correspond to previously specified target words. If so, the system could then add these new target words as new option words for the previously specified target words. In a similar manner, the DNAP system could alter the option words and/or associated relevance ratings used for additional initial, intermediate, and ending option words and for word connectors.

Those skilled in the art will also appreciate that in some embodiments the functionality provided by the routines discussed above may be provided in alternate ways, such as being split among more routines or consolidated into less routines. Similarly, in some embodiments illustrated routines may provide more or less functionality than is described, such as when other illustrated routines instead lack or include such functionality respectively, or when the amount of functionality that is provided is altered. In addition, those skilled in the art will appreciate that the data structures discussed above may be structured in different manners, such as by having a single data structure split into multiple data structures or by having multiple data structures consolidated into a single data structure. Similarly, in some embodiments illustrated data structures may store more or less information than is described, such as when other illustrated data structures instead lack or include such information respectively, or when the amount or types of information that is stored is altered.

From the foregoing it will be appreciated that, although specific embodiments have been described herein for purposes of illustration, various modifications may be made without deviating from the spirit and scope of the invention. Accordingly, the invention is not limited except as by any appended claims.

What is claimed is:

1. A computer-implemented method for determining alternative domain names for a domain name that is already registered, the method comprising:

receiving a request from a user to register a specified domain name, the domain name including a top-level domain name portion and a second-level domain name portion, the top-level domain name portion specifying a top-level domain and the second-level domain name portion including at least one word;

determining that the specified domain name is not available to be registered;

determining alternative domain names that are related to the specified domain name by:

determining word alternatives for the words included in the second-level domain name portion, the determined word alternatives including synonyms of the included words or translations of the included words into other languages;

generating alternative domain names whose second-level domain name portions include at least one of the determined word alternatives and whose top-level domain name portions specify the specified top-level domain;

selecting generated alternative domain names that are available to be registered as the determined alternative domain names;

determining a numerical percentage relevance rating for each of the selected alternative domain names, the numerical percentage relevance rating indicating the relevance of the alternative domain name to the domain name specified by the user independent of the other alternative domain names;

sending information to the user indicating that the selected alternative domain names are available to be registered and displaying the numerical percentage relevance ratings;

reserving automatically at least one of the selected alternative domain names for a limited time without registering the at least one selected alternative domain name;

receiving a request from the user that indicates to register at least one of the determined alternative domain names; and registering the at least one of the indicated alternative domain names for the user.

2. The method of claim 1 including determining alternative top-level domains that are distinct from the specified top-level domain, and wherein the determining of the alternative domain names includes generating and selecting alternative domain names whose top-level domain name portions specify one of the alternative top-level domains.

3. The method of claim 2 wherein the generated alternative domain names includes domain names whose second-level domain name portions include at least one of the determined word alternatives and whose top-level domain name portions are one of the alternative top-level domains.

4. The method of claim 1 wherein the sent information is a Web page that when displayed to the user includes selectable indications that correspond to the determined alternative domain names in such a manner that the user can request to register a determined alternative domain name by selecting one or more of the indications.

5. The method of claim 1 wherein the determined alternative domain names are further selected to have determined relevance ratings above a relevance rating threshold.

6. The method of claim 1 wherein the determined alternative domain names are further selected so that the number of determined alternative domain names satisfies a numeric threshold.

7. The method of claim 1 wherein the determining of the alternative domain names uses preference information associated with the user.

8. The method of claim 1 wherein the determining of the word alternatives includes requesting a third-party service to supply word alternatives for at least one included word and receiving the determined word alternatives from the service in response.

9. The method of claim 1 wherein the determining of the word alternatives for an included word includes retrieving alternative word options for the included word from a database of related words.

10. The method of claim 1 wherein the method is performed by a domain name registrar.

11. The method of claim 1 including obtaining payment from the user for the determining of the alternative domain names.

12. A computer-implemented method for determining alternative domain names that are related to a domain name, the method comprising:
receiving an indication of at least one lower-level domain name portion of a domain name;
determining whether at least one of the indicated lower-level domain name portions includes a target word for which at least one alternative option word can be identified;
for each of at least some of the indicated lower-level domain name portions that are determined to include a target word for which at least one alternative option word can be identified, generating at least one alternative lower-level domain name portion that includes at least one of the alternative option words for that target word;
determining a numerical percentage relevance rating for each of the generated alternative lower-level domain name portions, the numerical percentage relevance rating indicating the relevance of the alternative lower-level domain name portion to the indicated portion independent of the other alternative domain names;
providing an indication of the generated alternative lower-level domain name portions that can be used in alternative domain names that are related to the domain name and the numerical percentage relevance rating for each provided portion;
sending information to the user indicating that the selected alternative domain names are available to be registered and displaying the numerical percentage relevance ratings;
reserving automatically at least one of the selected alternative domain names for a limited time without registering the at least one selected alternative domain name;
receiving a request from the user that indicates to register at least one of the determined alternative domain names; and
registering the at least one of the indicated alternative domain names for the user.

13. The method of claim 12 wherein the alternative lower-level domain name portions for an indicated lower-level domain name portion are generated by replacing the target word in the indicated lower-level domain name portion with one of the alternative option words for the target word.

14. The method of claim 12 wherein the alternative lower-level domain name portions for an indicated lower-level domain name portion are generated by adding at least one alternative option word to the indicated lower-level domain name portion.

15. The method of claim 12 wherein the indicated lower-level domain name portion is a second-level domain name portion of the domain name.

16. The method of claim 12 wherein the indicated lower-level domain name portions are a second-level domain name portion and a third-level domain name portion of the domain name.

17. The method of claim 12 wherein the alternative option words are synonyms of the target word.

18. The method of claim 12 wherein the alternative option words are translations of the target word into another language.

19. The method of claim 12 wherein the alternative option words are from at least one of a group of related word categories that includes antonyms of the target word, homophones of the target word, idioms of the target word, hypernyms of the target word, hyponyms of the target word, meronyms of the target word, holonyms of the target word, metonyms of the target word, morphological forms of the target word, and acronyms of multiple portions of the target word.

20. The method of claim 19 wherein the group of related word categories further includes synonyms of the target word and translations of the target word into other languages, and wherein the generated alternative lower-level domain name portions include alternative option words of multiple of the related word categories.

21. The method of claim 12 wherein the alternative option words are additional initial, intermediate, or ending option words.

22. The method of claim 12 including, before the providing of the indication of the generated alternative lower-level domain name portions, generating at least one alternative domain name for the domain name by combining one or more of the generated alternative lower level domain name portions with a top-level domain name portion, and wherein the provided indication of the generated alternative lower-level domain name portions are of the generated alternative domain names that include the generated alternative lower-level domain name portions.

23. The method of claim 22 wherein indications of multiple lower-level domain name portions of the domain name are received, and wherein the generated alternative domain names each include multiple generated alternative lower-level domain name portions.

24. The method of claim 22 wherein multiple alternative domain names are generated, and wherein at least one of the multiple generated alternative domain names includes a top-level domain name portion that is distinct from a top-level domain name portion included by another of the multiple generated alternative domain names.

25. The method of claim 22 including, before the providing of the indication of the generated alternative domain names, removing generated alternative domain names that are unavailable for registering.

26. The method of claim 22 including automatically registering at least one of the generated alternative domain names for an indicated user.

27. The method of claim 22 including automatically reserving at least one of the generated alternative domain names for a limited time without registering the at least one of the generated alternative domain names.

28. The method of claim 22 wherein the provided indication is a Web page that when displayed includes indications of the generated alternative domain names.

29. The method of claim 22 including before the providing of the indication of the generated alternative domain names, removing generated alternative domain names whose determined relevance rating is below a relevance rating threshold.

30. The method of claim 22 including, before the providing of the indication of the generated alternative domain names, removing generated alternative domain names until the number of generated alternative domain names is below a maximum number threshold.

31. The method of claim 12 wherein the received indication of the lower-level domain name portions of the domain name is a request from a user to register the domain name.

32. The method of claim 31 including determining that the domain name is unavailable to be registered.

33. The method of claim 32 including placing the user on a waiting list for the domain name.

34. The method of claim 32 including assisting the user to make an offer for the domain name to an owner of the domain name.

35. The method of claim 12 including ranking the generated alternative lower-level domain name portions by relevance rating before the providing of the indication.

36. The method of claim 12 wherein the generating of the alternative lower-level domain name portions is based at least in part on preference information associated with a requester from whom the indication was received.

37. The method of claim 36 wherein the requester is a user, and including obtaining the preference information by querying the user for the preference information.

38. The method of claim 12 including obtaining payment for the providing of the indication from an indicated requester.

39. The method of claim 12 wherein indications of multiple lower-level domain name portions of the domain name are received, and wherein at least one of the generated alternative lower-level domain name portions is an alternative for all of the multiple lower-level domain name portions.

40. The method of claim 12 wherein the domain name has a single lower-level domain name portion, and wherein multiple alternative lower-level domain name portions are generated such that the multiple alternative lower-level domain name portions in combination are an alternative for the single lower-level domain name portion.

41. The method of claim 12 including determining the alternative option words for at least one of the target words and storing the determined alternative option words for future use.

42. The method of claim 12 wherein the received indication is received from a user, wherein the domain name is unavailable for registration by the user, wherein the provided indication is provided to the user, and including: receiving an indication of a second domain name selected by the user as an alternative to the domain name, the second domain name having at least one lower-level domain name portion; for at least one of the lower-level domain name portions of the second domain name, determining a word that is included in the lower-level domain name portion that corresponds to a target word in one of the indicated lower-level domain name portions of the domain name, the determined word distinct from the target word; and when the determined word was not one of the alternative option words for the target word, adding the determined word as an alternative option word for the target word.

43. The method of claim 12 wherein the alternative option words for a target word that are included in the generated alternative lower-level domain name portions are selected based on the relevance ratings determined for the alternative option words.

44. A computer-implemented method for determining alternative domain names that are related to a domain name, the method comprising:
   receiving an indication from a user of a domain name that is unavailable to be registered;
   determining that the domain name includes at least one target word for which related alternative words can be determined;
   generating alternative domain names that each include at least one of the related alternative words;
   determining a numerical percentage relevance rating for each of the alternative domain names, the numerical percentage relevance rating indicating the relevance of the alternative domain name independent of the other alternative domain names;
   reserving automatically at least one of the selected alternative domain names for a limited time without registering the at least one alternative domain name;
   displaying the alternative domain names to the user including the determined numerical percentage relevance ratings;
   receiving a request from the user that indicates to register at least one of the alternative domain names; and
   registering the at least one of the indicated alternative domain names for the user.

45. The method of claim 44 wherein the display of the alternative domain names includes at indication of at least one user-selectable control whose selection indicates a request by the user to register at least one of the alternative domain names.

46. The method of claim 44 wherein the alternative words for a target word are synonyms of the target word.

47. The method of claim 44 wherein the alternative words for a target word are translations of the target word into another language.

48. The method of claim 44 wherein at least some of the alternative domain names include a top-level domain name portion that is distinct from a top-level domain name portion of the domain name.

49. A computer-implemented method for determining alternative domain names for a domain name that is already registered, the method comprising:
   receiving a request from a user to register a specified domain name, the domain name including a top-level domain name portion and a second-level domain name portion, the top-level domain name portion specifying a top-level domain and the second-level domain name portion including at least one word;
   determining that the specified domain name is not available to be registered;
   determining alternative domain names that are related to the specified domain name by, determining word alternatives for the words included in the second-level domain name portion, the determined word alternatives including synonyms of the included words or translations of the included words into other languages; generating alternative domain names whose second-level domain name portions include at least one of the determined word alternatives and whose top-level domain name portions specify the specified top-level domain;

selecting generated alternative domain names that are available to be registered as the determined alternative domain names;

determining a numerical percentage relevance rating for each of the selected alternative domain names, the numerical percentage relevance rating indicating the relevance of the alternative domain name to the domain name specified by the user independent of the other alternative domain names;

sending information to the user indicating that the selected alternative domain names are available to be registered and displaying the numerical percentage relevance ratings;

automatically reserving at least one of the selected alternative domain names for a limited time without registering the at least one of the selected alternative domain names;

receiving a request from the user that indicates to register at least one of the determined alternative domain names; and registering the at least one of the indicated alternative domain names for the user.

* * * * *

UNITED STATES PATENT AND TRADEMARK OFFICE
CERTIFICATE OF CORRECTION

PATENT NO. : 7,664,831 B2 Page 1 of 1
APPLICATION NO. : 09/970096
DATED : February 16, 2010
INVENTOR(S) : Cartmell et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1036 days.

Signed and Sealed this

Seventh Day of December, 2010

David J. Kappos
*Director of the United States Patent and Trademark Office*